United States Patent
Crandall et al.

(10) Patent No.: US 11,966,896 B1
(45) Date of Patent: Apr. 23, 2024

(54) SYSTEMS AND METHODS FOR EXPANDED CASH MANAGEMENT FUNCTIONALITY VIA A CASH HANDLING DEVICE

(71) Applicant: G4S Retail Solutions (USA) Inc., Jupiter, FL (US)

(72) Inventors: Shellie Crandall, Palm Beach Gardens, FL (US); Brian McCabe, Jupiter, FL (US)

(73) Assignee: G4S Retail Solutions (USA) Inc., Jupiter, FL (US)

( * ) Notice: Subject to any disclaimer, the term of this patent is extended or adjusted under 35 U.S.C. 154(b) by 184 days.

(21) Appl. No.: 17/243,210

(22) Filed: Apr. 28, 2021

Related U.S. Application Data

(60) Provisional application No. 63/018,042, filed on Apr. 30, 2020.

(51) Int. Cl.
| | |
|---|---|
| *G06F 3/048* | (2013.01) |
| *G06F 3/0481* | (2022.01) |
| *G06F 3/0484* | (2022.01) |
| *G06F 18/214* | (2023.01) |
| *G06N 20/00* | (2019.01) |
| *G06Q 10/0639* | (2023.01) |
| *G06Q 20/20* | (2012.01) |

(52) U.S. Cl.
CPC ........... *G06Q 20/20* (2013.01); *G06F 3/0481* (2013.01); *G06F 3/0484* (2013.01); *G06F 18/214* (2023.01); *G06N 20/00* (2019.01); *G06Q 10/06398* (2013.01)

(58) Field of Classification Search
CPC .......... G06N 20/00; G06N 3/08; G06N 3/048; G06Q 20/1085; G06Q 20/10; G06Q 20/04; G06Q 40/02; G06F 3/0481; G06F 3/0482; G06F 3/04883; G06F 30/27; G06F 2203/0383; G06F 3/016; G07F 17/3211; G07F 9/06
See application file for complete search history.

(56) References Cited

U.S. PATENT DOCUMENTS

| | | | |
|---|---|---|---|
| 5,823,781 A * | 10/1998 | Hitchcock | .......... G09B 19/0053 434/323 |
| 7,610,215 B1 | 10/2009 | Folk et al. | |
| 7,620,894 B1 * | 11/2009 | Kahn | .................. G06F 3/04895 715/708 |
| 7,635,085 B2 | 12/2009 | Brown et al. | |
| 7,900,829 B1 | 3/2011 | Folk et al. | |

(Continued)

*Primary Examiner* — Steven B Theriault
(74) *Attorney, Agent, or Firm* — Alston & Bird LLP

(57) ABSTRACT

Machine-learning based modelling may be utilized to automatically select a particular display variation of a user interface to be displayed to a user of a specially configured computing device, such as a cash handling device used in a retail establishment. To provide user-specific display variations of user interfaces, activity trackers generate activity data for the users interacting with user interfaces of the specially configured computing device. A machine-learning model is then executed to select an applicable display variation of a plurality of available display variations for the user, based at least in part on the generated activity data. Thereafter, when the specially configured computing device receives a request to display the user interface, the applicable display variation of the user interface is displayed for the user.

18 Claims, 25 Drawing Sheets

(56) References Cited

U.S. PATENT DOCUMENTS

| | | |
|---|---|---|
| 7,940,176 B2 | 5/2011 | Bohen et al. |
| 7,950,512 B2 | 5/2011 | Folk et al. |
| 7,954,699 B1 | 6/2011 | Sanders et al. |
| 8,011,581 B1 | 9/2011 | Folk et al. |
| 8,019,663 B1 | 9/2011 | Bohen et al. |
| 8,025,214 B1 | 9/2011 | Folk et al. |
| 8,032,415 B2 | 10/2011 | Sanders et al. |
| 8,047,427 B2 | 11/2011 | Sanders et al. |
| 8,056,305 B1 | 11/2011 | Folk et al. |
| 8,096,398 B2 | 1/2012 | Folk et al. |
| 8,117,127 B1 * | 2/2012 | Sanders ............... G06Q 40/12 |
| | | 705/30 |
| 8,141,772 B1 | 3/2012 | Folk et al. |
| 8,157,078 B1 | 4/2012 | Folk et al. |
| 8,172,067 B1 | 5/2012 | Folk et al. |
| 8,175,970 B1 | 5/2012 | Mon et al. |
| 8,177,132 B1 | 5/2012 | Bohen et al. |
| 8,181,854 B1 | 5/2012 | Folk et al. |
| 8,181,856 B1 | 5/2012 | Folk et al. |
| 8,196,826 B2 | 6/2012 | Folk et al. |
| 8,201,680 B1 | 6/2012 | Folk et al. |
| 8,210,429 B1 | 7/2012 | Bohen et al. |
| 8,214,257 B1 * | 7/2012 | Folk ............... G06Q 20/2295 |
| | | 705/16 |
| 8,225,988 B1 * | 7/2012 | Bohen ............... G07F 19/209 |
| | | 235/379 |
| 8,227,936 B1 | 7/2012 | Folk et al. |
| 8,260,669 B1 | 9/2012 | Folk et al. |
| 8,272,563 B1 | 9/2012 | Folk et al. |
| 8,274,364 B1 | 9/2012 | Bohen et al. |
| 8,327,995 B1 | 12/2012 | Folk et al. |
| 8,346,640 B1 | 1/2013 | Sanders et al. |
| 8,387,874 B1 | 3/2013 | Bohen et al. |
| 8,396,278 B2 | 3/2013 | Jones et al. |
| 8,401,965 B2 | 3/2013 | Johnson et al. |
| 8,407,119 B2 | 3/2013 | Folk et al. |
| 8,430,303 B1 | 4/2013 | Sanders et al. |
| 8,517,257 B1 | 8/2013 | Folk et al. |
| 8,556,166 B1 | 10/2013 | Folk et al. |
| 8,561,885 B1 | 10/2013 | Folk et al. |
| 8,571,948 B1 | 10/2013 | Nichols et al. |
| 8,600,842 B1 | 12/2013 | Sanders et al. |
| 8,601,771 B2 | 12/2013 | Folk et al. |
| 8,602,295 B1 * | 12/2013 | Sanders ............... G07D 11/28 |
| | | 235/379 |
| 8,640,945 B1 | 2/2014 | McCormick |
| 8,732,662 B1 * | 5/2014 | Savant ............... G06F 9/451 |
| | | 717/121 |
| 8,775,332 B1 * | 7/2014 | Morris ............... G06N 5/02 |
| | | 706/11 |
| 8,781,903 B1 | 7/2014 | Bohen et al. |
| 8,812,366 B2 | 8/2014 | Folk et al. |
| 8,812,394 B1 * | 8/2014 | Folk ............... G07D 11/24 |
| | | 235/379 |
| 8,909,547 B2 | 12/2014 | Bohen et al. |
| 8,925,797 B1 | 1/2015 | Bohen et al. |
| 9,004,352 B1 | 4/2015 | Graef et al. |
| 9,064,366 B1 | 6/2015 | Folk et al. |
| 9,070,125 B1 | 6/2015 | Folk et al. |
| 9,098,960 B1 | 8/2015 | Folk et al. |
| 9,152,529 B2 * | 10/2015 | George ............... G06F 3/0481 |
| 9,311,671 B2 | 4/2016 | Folk et al. |
| 9,405,427 B2 * | 8/2016 | Curtis ............... G06N 20/00 |
| 9,547,848 B2 | 1/2017 | Folk et al. |
| 9,697,493 B2 | 7/2017 | Folk et al. |
| 9,715,793 B1 | 7/2017 | Brancaccio |
| 9,729,403 B1 * | 8/2017 | Rabe ............... H04L 41/22 |
| 9,921,824 B2 * | 3/2018 | Edmonds ............... G06F 9/4405 |
| 9,959,112 B2 * | 5/2018 | Edmonds ............... G06F 9/44505 |
| 10,198,258 B2 * | 2/2019 | Edmonds ............... G06F 8/656 |
| 10,380,819 B2 * | 8/2019 | Shimizu ............... G07D 9/006 |
| 10,585,547 B2 * | 3/2020 | Holzer ............... G06F 9/451 |
| 10,768,952 B1 * | 9/2020 | Watson ............... G06F 16/972 |
| 10,785,310 B1 * | 9/2020 | Mohen ............... G06F 3/04842 |
| 11,042,272 B2 * | 6/2021 | Deselaers ............... G06F 8/38 |
| 11,112,950 B2 * | 9/2021 | Srivastava ............ A61B 5/0002 |
| 11,315,379 B1 * | 4/2022 | Crandall ............... G07G 1/0009 |
| 11,334,893 B1 * | 5/2022 | Mattison, Sr. ......... G07D 11/32 |
| 11,520,947 B1 * | 12/2022 | Serackis ............... G06F 9/453 |
| 2003/0046401 A1 * | 3/2003 | Abbott ............... G06F 9/451 |
| | | 709/227 |
| 2005/0027626 A1 | 2/2005 | Garcia |
| 2005/0289030 A1 | 12/2005 | Smith |
| 2007/0300185 A1 * | 12/2007 | Macbeth ............... G06F 9/451 |
| | | 715/764 |
| 2008/0189628 A1 * | 8/2008 | Liesche ............... G06F 16/9535 |
| | | 707/E17.109 |
| 2008/0235064 A1 * | 9/2008 | Gulko ............... H01L 21/28035 |
| | | 257/E21.133 |
| 2009/0070263 A1 | 3/2009 | Davis et al. |
| 2010/0127070 A1 * | 5/2010 | Sanders ............... G07F 19/202 |
| | | 235/379 |
| 2010/0131482 A1 * | 5/2010 | Linthicum ............ G16H 40/63 |
| | | 707/706 |
| 2011/0060639 A1 | 3/2011 | Garcia |
| 2011/0258090 A1 | 10/2011 | Bosch et al. |
| 2012/0073482 A1 | 3/2012 | Meeker et al. |
| 2012/0219939 A1 * | 8/2012 | Aikawa ............... G09B 19/24 |
| | | 434/379 |
| 2013/0191196 A1 | 7/2013 | Cecala |
| 2013/0232064 A1 | 9/2013 | Bosch |
| 2013/0346135 A1 | 12/2013 | Siemens et al. |
| 2014/0115466 A1 * | 4/2014 | Barak ............... G06F 9/451 |
| | | 715/765 |
| 2014/0279675 A1 | 9/2014 | Wiig et al. |
| 2014/0353375 A1 | 12/2014 | Turocy et al. |
| 2015/0127406 A1 * | 5/2015 | Hoen, IV ............. H04L 63/104 |
| | | 705/7.22 |
| 2015/0128249 A1 * | 5/2015 | Alexandrian ........... G06F 21/62 |
| | | 726/16 |
| 2016/0062579 A1 * | 3/2016 | Lee ............... G06F 9/453 |
| | | 715/708 |
| 2016/0062603 A1 * | 3/2016 | Halbedel ............... G06N 20/00 |
| | | 715/762 |
| 2016/0085698 A1 * | 3/2016 | Mikkola ............... G06F 13/128 |
| | | 710/8 |
| 2016/0188695 A1 * | 6/2016 | Lee ............... G06F 8/60 |
| | | 707/738 |
| 2016/0260017 A1 * | 9/2016 | João Viol Vieira ..... H04L 67/06 |
| 2017/0031575 A1 * | 2/2017 | Dotan-Cohen ........ G06F 3/04842 |
| 2017/0061561 A1 | 3/2017 | Cha |
| 2017/0124813 A1 * | 5/2017 | Misener ............... G07D 3/00 |
| 2017/0232300 A1 | 8/2017 | Tran et al. |
| 2018/0005196 A1 | 1/2018 | Crandall et al. |
| 2018/0067753 A1 * | 3/2018 | Balboni ............... G06F 8/38 |
| 2018/0078843 A1 | 3/2018 | Tran et al. |
| 2018/0218323 A1 | 8/2018 | Nguyen |
| 2018/0239500 A1 * | 8/2018 | Allen ............... G06F 3/0488 |
| 2018/0240190 A1 | 8/2018 | Schumacher |
| 2018/0286462 A1 * | 10/2018 | Becherer ............... G11B 27/036 |
| 2018/0341378 A1 * | 11/2018 | Morrow ............... G06F 3/0484 |
| 2018/0364879 A1 * | 12/2018 | Adam ............... G06F 3/0484 |
| 2019/0205513 A1 * | 7/2019 | Priya ............... G06F 21/316 |
| 2019/0220839 A1 | 7/2019 | Oliynyk |
| 2019/0228463 A1 * | 7/2019 | Chan ............... G06F 3/0488 |
| 2019/0303904 A1 * | 10/2019 | Sanchez-Llorens ......... G06Q 20/203 |
| 2019/0303938 A1 * | 10/2019 | Sanchez-Llorens ......... G06Q 20/405 |
| 2019/0361579 A1 * | 11/2019 | Srivastava ............ G06F 9/451 |
| 2021/0089810 A1 * | 3/2021 | Zhang ............... G07D 5/02 |
| 2021/0335141 A1 * | 10/2021 | Taylor ............... G07D 11/36 |
| 2022/0012800 A1 * | 1/2022 | Bendre ............... G06Q 30/0643 |
| 2022/0202168 A1 * | 6/2022 | Troutman ............ G06V 10/449 |
| 2022/0374812 A1 * | 11/2022 | Riedl ............... G06Q 10/06398 |
| 2022/0382565 A1 * | 12/2022 | Sunkara ............... G06N 3/045 |
| 2023/0004950 A1 * | 1/2023 | Doka ............... G07G 1/0009 |

* cited by examiner

SYSTEMS AND METHODS FOR EXPANDED CASH MANAGEMENT FUNCTIONALITY VIA A CASH HANDLING DEVICE

CROSS-REFERENCE TO RELATED APPLICATIONS

This patent application claims priority to U.S. Provisional Patent Application Ser. No. 63/018,042, filed Apr. 30, 2020 which is incorporated herein by reference in its entirety.

BACKGROUND

Special purpose computing devices and machinery, such as cash handling devices utilized at retail establishments require special training for users (e.g., employees of a brick-and-mortar retail establishment). However, the retail environment may require that several different users have access to utilize the special purpose computing devices to maintain efficient operation of the retail environment. As the number of users with access to the special purpose computing devices increases however, it becomes increasingly more difficult to implement changes to the operation of those special purpose computing devices (e.g., through software updates), because certain changes require updated training for every authorized user of the special purpose computing device. Even after training however, certain authorized users may continue to struggle with using certain special purpose computing devices efficiently, which can lead to incorrect usage of those special purpose computing devices. Therefore, a need exists for improved special purpose computing devices and/or software or firmware for operating the same.

BRIEF SUMMARY

To ensure smooth and proper operation of special purpose computing devices and machinery such as cash handling devices, special purpose computing devices of certain embodiments operate with machine-learning supported user interfaces for tracking characteristics of a user's operation of the special purpose computing devices and for automatically modifying certain user interface displays to facilitate proper operation of the special purpose computing devices to accommodate any identified difficulties a user has experienced in utilizing the special purpose computing devices. For example, portions of a user interface screen may be emphasized for a user upon determining that user struggles with a particular user interface screen, the content and/or organization of the user interface screen may be modified (e.g., by rearranging features displayed on the user interface screen, by changing text-based instructions displayed on the user interface screen, by hiding/removing features displayed on a user interface screen, and/or the like) to accommodate a user's ability to utilize the special purpose computing devices, and/or the like. Moreover, the machine-learning supported user interface may further implement a training mode for first-time users (or users having accessed the special purpose computing device less than a threshold number of times), as determined based at least in part on a number of times a particular user identifier has been presented to the special purpose computing device for access.

Various embodiments are directed to a system for managing user interface screens to be presented via a cash handling device based at least in part on user competency levels. In certain embodiments, the system comprises: one or more memory storage areas; and one or more processors collectively configured to: receive activity data for a user interacting with one or more user interfaces, wherein the activity data is stored in association with a user identifier of the user and the activity data reflects the user's interactions with the one or more user interfaces via a user interface element of the cash handling device; execute a machine-learning based model for selecting an applicable display variation for at least one user interface of the one or more user interfaces based at least in part on the activity data, wherein the applicable display variation is selected from a plurality of display variations for the at least one user interface and wherein the plurality of display variations are provided to accommodate a plurality of user competency levels; receive a request to display the at least one user interface, wherein the request comprises the user identifier of the user; and cause a display device of the cash handling device to display the applicable display variation of the at least one user interface.

In certain embodiments, the machine-learning based model is trained, at least in part, by: receiving training data for a plurality of users, wherein training data comprises activity data corresponding to each of the plurality of users that is indicative of the plurality of users' interactions with the one or more user interfaces; classifying each of the plurality of users into one of a plurality of competency levels; and assigning a display variation of the plurality of display variations to each of the plurality of competency levels. In certain embodiments, the training data comprises activity data corresponding to each of the plurality of users that is indicative of the plurality of users' interactions with a plurality of user interfaces. In various embodiments, classifying each of the plurality of users into one of a plurality of competency levels comprises: generating a competency score for each user based at least in part on the activity data; and classifying each of the plurality of users into one of a plurality of competency levels based at least in part on the competency score generated for each user.

In various embodiments, the request to display the at least one user interface is embodied as a request to display a user interface set comprising a plurality of user interfaces; and causing the display device of the cash handling device to display the applicable display variation of the at least one user interface comprises causing the display device of the cash handling device to display a display variation of each of the plurality of user interfaces within the user interface set in accordance with a display order of the plurality of user interfaces within the user interface set. In certain embodiments, each of plurality of display variations for a user interface are stored in the one or more memory storage areas together with a user interface identifier and a display variation identifier, and wherein: causing the display device of the cash handling device to display the applicable display variation of the at least one user interface comprises retrieving the applicable display variation for the at least one user interface based at least in part on the user interface identifier for the at least one user interface and the display variation identifier for the applicable display variation.

Certain embodiments are directed to a method for managing user interface screens to be presented via a cash handling device based at least in part on user competency levels. In various embodiments, the method comprises: receiving, via one or more processors, activity data for a user interacting with one or more user interfaces, wherein the activity data is stored in association with a user identifier of the user and the activity data reflects the user's interactions with the one or more user interfaces via a user interface element of the cash handling device; executing, via the one or more processors, a machine-learning based model for selecting an applicable display variation for at least one user interface of the one or more user interfaces based at least in part on the activity data, wherein the applicable display variation is selected from a plurality of display variations for the at least one user interface and wherein the plurality of display variations are provided to accommodate a plurality of user competency levels; receiving, via the one or more processors, a request to display the at least one user interface, wherein the request comprises the user identifier of the user; and causing, via the one or more processors, a display device of the cash handling device to display the applicable display variation of the at least one user interface.

In various embodiments, the method further comprises training the machine-learning based model, at least in part, by: receiving training data for a plurality of users, wherein training data comprises activity data corresponding to each of the plurality of users that is indicative of the plurality of users' interactions with the one or more user interfaces; classifying each of the plurality of users into one of a plurality of competency levels; and assigning a display variation of the plurality of display variations to each of the plurality of competency levels. Moreover, the training data may comprise activity data corresponding to each of the plurality of users that is indicative of the plurality of users' interactions with a plurality of user interfaces. In certain embodiments, classifying each of the plurality of users into one of a plurality of competency levels comprises: generating a competency score for each user based at least in part on the activity data; and classifying each of the plurality of users into one of a plurality of competency levels based at least in part on the competency score generated for each user. In certain embodiments, the request to display the at least one user interface is embodied as a request to display a user interface set comprising a plurality of user interfaces; and causing the display device of the cash handling device to display the applicable display variation of the at least one user interface comprises causing the display device of the cash handling device to display a display variation of each of the plurality of user interfaces within the user interface set in accordance with a display order of the plurality of user interfaces within the user interface set. In various embodiments, each of plurality of display variations for a user interface are stored in one or more memory storage areas together with a user interface identifier and a display variation identifier, and wherein causing the display device of the cash handling device to display the applicable display variation of the at least one user interface comprises retrieving the applicable display variation for the at least one user interface based at least in part on the user interface identifier for the at least one user interface and the display variation identifier for the applicable display variation.

Certain embodiments are directed to a computer program product comprising a non-transitory computer readable medium having computer program instructions stored therein, the computer program instructions when executed by a processor, cause the processor to: receive activity data for a user interacting with one or more user interfaces, wherein the activity data is stored in association with a user identifier of the user and the activity data reflects the user's interactions with the one or more user interfaces via a user interface element of a cash handling device; execute a machine-learning based model for selecting an applicable display variation for at least one user interface of the one or more user interfaces based at least in part on the activity data, wherein the applicable display variation is selected from a plurality of display variations for the at least one user interface and wherein the plurality of display variations are provided to accommodate a plurality of user competency levels; receive a request to display the at least one user interface, wherein the request comprises the user identifier of the user; and cause a display device of the cash handling device to display the applicable display variation of the at least one user interface.

In various embodiments, the machine-learning based model is trained, at least in part, by: receiving training data for a plurality of users, wherein a training data comprises activity data corresponding to each of the plurality of users that is indicative of the plurality of users' interactions with the one or more user interfaces; classifying each of the plurality of users into one of a plurality of competency levels; and assigning a display variation of the plurality of display variations to each of the plurality of competency levels. In certain embodiments, the training data comprises activity data corresponding to each of the plurality of users that is indicative of the plurality of users' interactions with a plurality of user interfaces. Moreover, in various embodiments, classifying each of the plurality of users into one of a plurality of competency levels comprises: generating a competency score for each user based at least in part on the activity data; and classifying each of the plurality of users into one of a plurality of competency levels based at least in part on the competency score generated for each user. In various embodiments, the request to display the at least one user interface is embodied as a request to display a user interface set comprising a plurality of user interfaces; and causing the display device of the cash handling device to display the applicable display variation of the at least one user interface comprises causing the display device of the cash handling device to display a display variation of each of the plurality of user interfaces within the user interface set in accordance with a display order of the plurality of user interfaces within the user interface set.

In certain embodiments, each of plurality of display variations for a user interface are stored in one or more memory storage areas together with a user interface identifier and a display variation identifier, and wherein: causing the display device of the cash handling device to display the applicable display variation of the at least one user interface comprises retrieving the display variation for the at least one user interface based at least in part on the user interface identifier for the at least one user interface and the applicable display variation identifier for the applicable display variation.

BRIEF DESCRIPTION OF THE SEVERAL VIEWS OF THE DRAWINGS

Reference will now be made to the accompanying drawings, which are not necessarily drawn to scale, and wherein.

DETAILED DESCRIPTION

Figure 1:
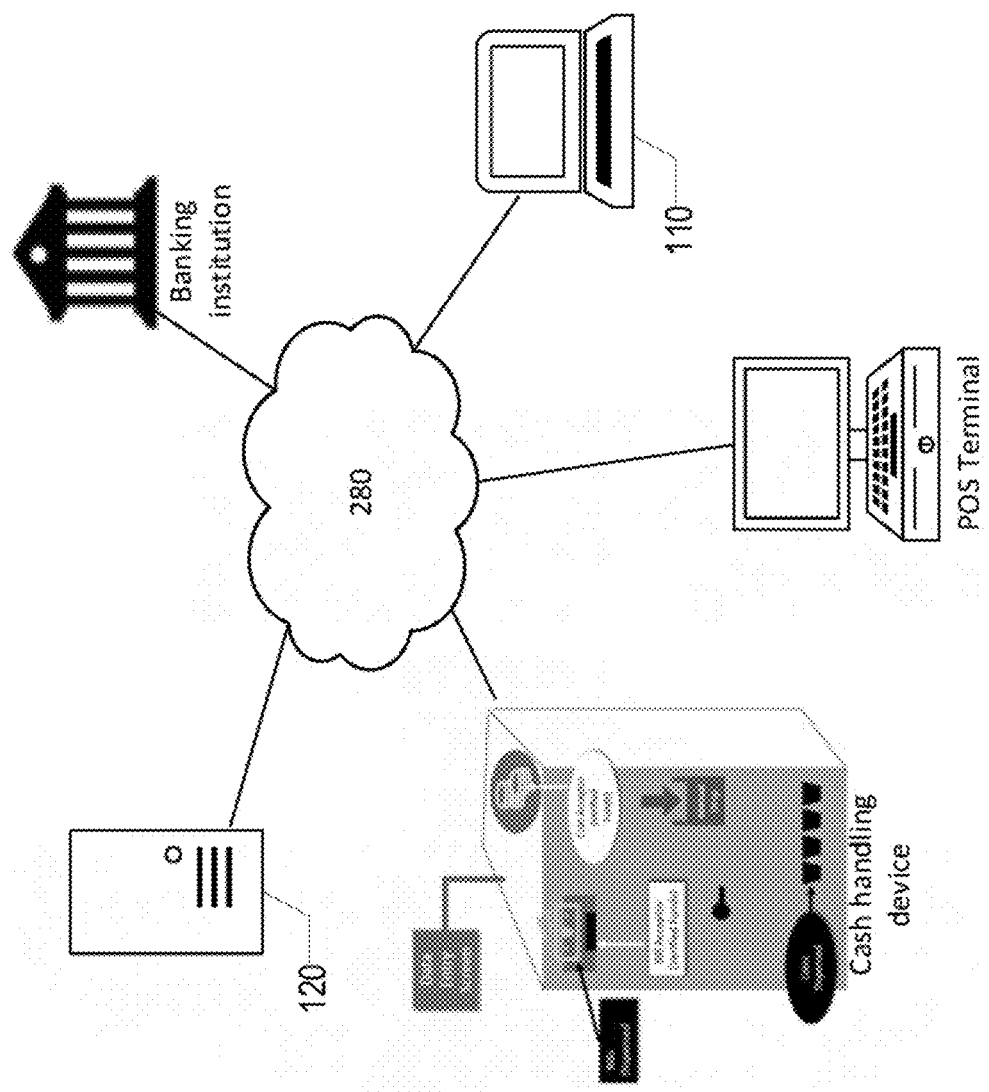
FIG. 1 illustrates a network environment in which data may be transferred regarding the functionality of a cash handling device according to certain embodiments.

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

The operation of special purpose computing devices and machinery, such as cash handling devices for storing and/or dispensing cash within a brick-and-mortar retail establishment may require certain user input through one or more user interfaces displayed to an authorized user thereof. Where user interfaces are applicable to a plurality of authorized users of the special purpose computing devices and machinery, the operation of the special purpose computing devices and machinery may be inconsistent between users, as different users have different abilities and/or skills to complete instructed tasks presented via the user interfaces. If the user interfaces are tailored for highly skilled users, then new users and less skilled users may be incapable of properly identifying how to utilize the special purpose computing devices and machinery. On the other hand, if the user interfaces are tailored for new users, then more highly skilled users may ignore many of the provided prompts and/or instructions, and may thus incorrectly operate the special purpose computing devices and machinery by ignoring key instructional prompts provided via the user interfaces. Therefore, universally-applicable instructional prompts for operation of a special purpose computing device may lead to improper usage of those special purpose computing devices, which may lead to damage to the device itself in certain circumstances, or may lead to generation of error-filled data that may be transmitted to other devices and/or may cause incorrect operation of certain other network-connected computing devices.

To mitigate potential errors that may arise from incorrect operation of special-purpose computing devices and machinery, user-specific instructional interfaces are generated and provided to accommodate the skills and preferences of individual users. These user specific instructional interfaces may be generated to comply with a specific retailer's display requirements (e.g., a retailer may request that the displays utilize a specific color scheme, include the retailer's logo, and/or the like). Certain user-specific preferences may be accommodated based on intentionally-selected preferences (e.g., default font-size, color schemes, and/or the like), many user-specific preferences, settings, and/or the like that are provided to facilitate user operation of the special-purpose computing devices and machinery are not consciously determined by the user, but are instead determined based at least in part on the user's ability to effectively utilize instructions and/or other prompts of user interfaces provided by a special-purpose computing device. To identify a particular user's ability to effectively utilize a special-purpose computing device, the special-purpose computing devices are configured to require a user to sign-in using a user-specific identifier. After sign-in, the special-purpose computing devices utilize activity trackers, such as key trackers, input trackers, and/or other user interface tracking software and firmware to monitor the user's usage of the special-purpose computing device. Moreover, data generated by the user tracking software and firmware is provided to a machine-learning based model for identifying specific functions of the special-purpose computing device that the user struggles with, and/or for generally determining the user's level of competency of utilizing the special-purpose computing device. The machine-learning based model is further configured to customize the user interfaces provided to the user during use of the special-purpose computing device based on the determined characteristics of the users' usage of the special-purpose computing device. For example, users who take an atypically long time to complete certain tasks may receive user interfaces having additional instructional prompts to facilitate the user's operation of the special-purpose computing device. As another example, users who move through many user interface screens at a high speed may be provided by display variations of user interface screens having less instructional prompts, and in some instances the user interface screens may be periodically reorganized to force the user to more carefully read the user interface prompts to ensure the user is properly completing instructed tasks corresponding to the particular user interface.

The example user interface configurations discussed herein are provided to reimagine the way retail users complete standard operating procedures (SOPs) relating to cash handling with an innovative, forward-focused and intuitive experience that's easy to understand and adopt. While the examples discussed herein are specially provided for operation of a cash handling device, it should be understood that various embodiments may be configured for generating user interfaces for operation of other special-purpose computing devices and/or machinery.

Certain configurations utilize logic-based algorithms, machine-learning based models, and/or combinations thereof to gather data behind the scenes enabling users to work through each step in a retail store's accounting processes, providing real-time feedback as tasks are completed. The provided logic monitors and analyzes all cash that comes in and out of each register to provide accurate cash balances, drastically reducing reconciliation issues. As a result, users of the cash handling device spend less time in the accounting office and more time doing customer-facing activities. The configurations walk the user through each step intuitively and based on the user's determined skill level (as determined by the machine-learning model), allowing the users to follow a new SOP with no errors or assistance. This minimizes and/or eliminates the need for typical, expensive industry training sessions that only go over the procedures in a single setting, enabling greater continuity and accuracy of tasks as new associates are added to the retailer team frequently. As SOPs change, the operation of systems (including the cash handling device, the machine-learning based model, the logic algorithms, and/or the like) can be amended to change with it so the user is led through new processes without missing a beat or having to go through another round of training.

Discussed herein is a single example set of user interfaces that may be provided in accordance with certain embodiments to walk through a particular user's morning routine in utilizing a cash handling device. The systems enable a Standard Work Process for users as they complete tasks with a cash handling device and/or in the accounting office. Once a step on the cash handling device has been completed, the embodiments generate and display instructions on the next step (e.g., via generation of a request for a next user interface and for providing the next user interface in response to the generated request) so the user remains aware of next steps in a process. User error is drastically reduced because the configurations ensure retailer-directed business rules are displayed and this enables users to complete every step efficiently and accurately along the way.

Moreover, certain configurations track and analyze the retailer's real-time cash usage and use logic to automate an accurate number of bills needed in each denomination, eliminating the need for a user to estimate a cash mix themselves. This logic enables users to spend less time in the accounting office and more time doing customer-facing activities.

This user adoption approach is incredibly intuitive, guiding the associate through all necessary tasks on the recycler safe and other procedures such as VeriBalance tasks in the accounting office.

Computer Program Products, Methods, and Computing Entities

Embodiments of the present invention may be implemented in various ways, including as computer program products that comprise articles of manufacture. Such computer program products may include one or more software components including, for example, software objects, methods, data structures, and/or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution). The terms software, computer program product, and similar words may be used herein interchangeably.

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media/memory).

In one embodiment, a non-volatile computer-readable storage medium may include a floppy disk, flexible disk, hard disk, solid-state storage (SSS) (e.g., a solid state drive (SSD), solid state card (SSC), or solid state module (SSM)), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-recordable (CD-R), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

Exemplary System Architecture

FIG. 1 provides an illustration of an exemplary embodiment of the present invention. As shown in FIG. 1, this particular embodiment may include one or more monitoring servers 120, one or more mobile devices 110, one or more cash handling devices as discussed herein, one or more point-of-sale (POS) devices, one or more networks 280 enabling communication among computing devices and a banking institution (e.g., a banking institution server system), and/or the like. In various embodiments, certain of these devices (e.g., the POS terminal within a retailer may be in communication with the monitoring server 120 via a back-office service hosted locally at the retail establishment. Each of these components, entities, devices, systems, and similar words used herein interchangeably may be in direct or indirect communication with, for example, one another over the same or different wired or wireless networks. Additionally, while FIG. 1 illustrates the various system entities as separate, standalone entities, the various embodiments are not limited to this particular architecture.

Monitoring Server

Figure 2:
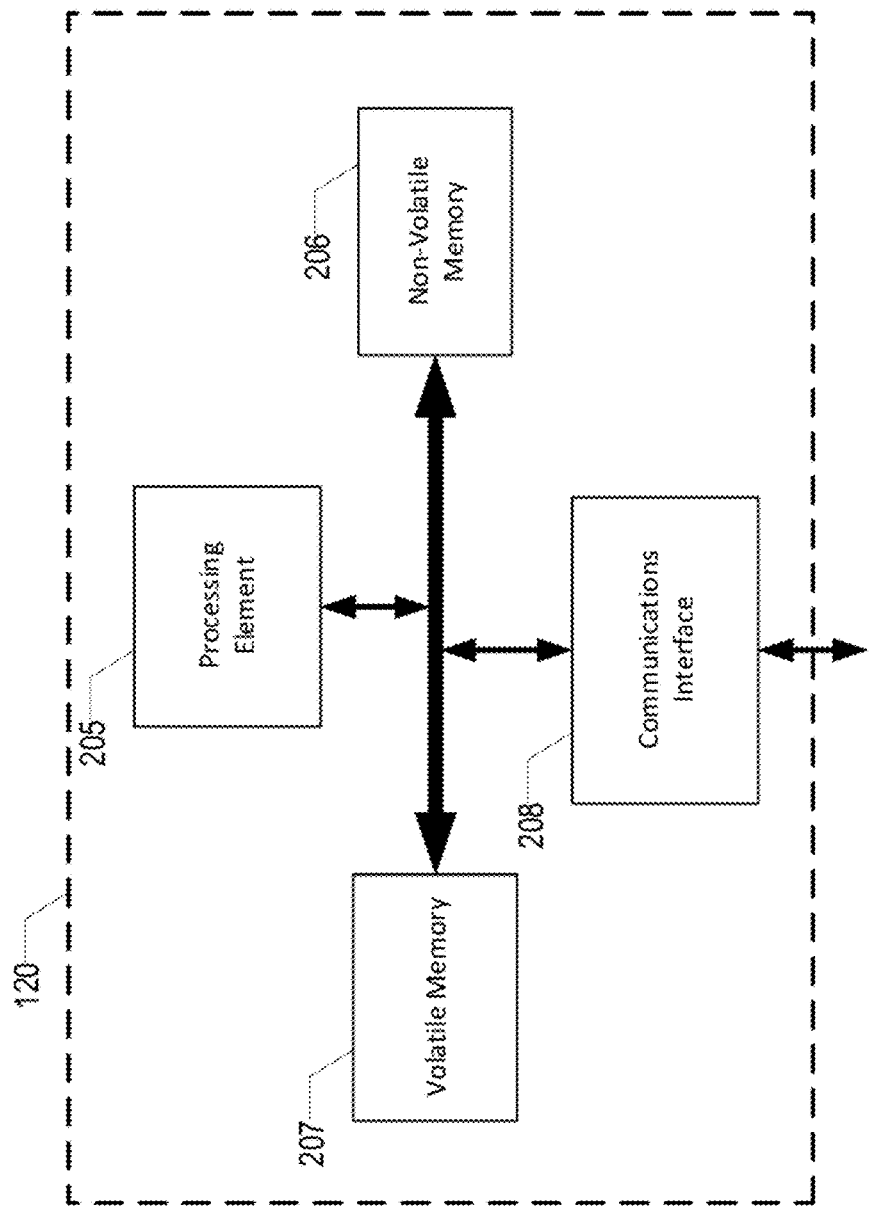
FIG. 2 schematically illustrates features of a monitoring server according to certain embodiments.

FIG. 2 provides a schematic of a monitoring server 120 according to one embodiment of the present invention. In one embodiment, the monitoring server 120 may be in network communication with one or more cash handling devices for monitoring transactions occurring in association with those cash handling devices, one or more banking institutions to transmit transaction data to appropriate banking institutions and/or one or more mobile devices 110 to provide various summary data thereto. In certain embodiments, the monitoring server 120 may be operable in association with other computing devices and/or platforms (e.g., operable via third parties, such as banking institutions' online banking platforms) to accomplish certain functions (e.g., user authentication) to retrieve certain data, and/or the like. In general, the terms computing entity, computer, entity, device, system, server, machine, and/or similar words used herein interchangeably may refer to, for example, one or more computers, computing entities, desktop computers, mobile phones, tablets, phablets, notebooks, laptops, distributed systems, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, controlling, remotely controlling, dispensing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

In one embodiment, the monitoring server 120 may include or be in communication with one or more monitoring server data repositories and/or one or more processing elements 205 (also referred to as processors, processing circuitry, processing device, and/or similar terms used herein interchangeably) that communicate with other elements within the monitoring server 120 via a bus, for example. In certain embodiments, the monitoring server data repositories may maintain a wide variety of data accessible to the monitoring server 120, such as user-specific items (e.g., user (login) ID, password (or other authentication credential(s)), one or more account number(s), user name, user registration status, and/or the like). As will be understood, the processing element 205 may be embodied in a number of different ways. For example, the processing element 205 may be embodied as one or more complex programmable logic devices (CPLDs), "cloud" processors, microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media/memory or otherwise accessible to the processing element 205. As such, whether configured by hardware or computer program products, or by a combination thereof, the processing element 205 may be capable of performing steps or operations according to embodiments of the present invention when configured accordingly.

In one embodiment, the monitoring server 120 may further include or be in communication with non-volatile media/memory (also referred to as non-volatile storage, memory, memory storage, memory circuitry and/or similar terms used herein interchangeably). In one embodiment, the non-volatile storage or memory may include one or more non-volatile storage or memory media 206, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or information/data that is stored in a computer-readable storage medium using one or more database models, such as a hierarchical database model, network model, relational model, entity—relationship model, object model, document model, semantic model, graph model, and/or the like.

In one embodiment, the monitoring server 120 may further include or be in communication with volatile media/memory (also referred to as volatile storage, memory, memory storage, memory circuitry and/or similar terms used herein interchangeably). In one embodiment, the volatile storage or memory may also include one or more volatile storage or memory media 207, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the monitoring server 120 with the assistance of the processing element 205 and operating system.

As indicated, in one embodiment, the monitoring server 120 may also include one or more communications elements/interfaces 208 for communicating with various computing entities, such as by communicating data, content, information, and/or similar terms used herein interchangeably that can be transmitted, received, operated on, processed, displayed, stored, and/or the like. For instance, the monitoring server 120 may communicate with one or more mobile devices 110, one or more cash handling devices, one or more networks 280, one or more banking institutions' computing systems, and/or the like.

In certain embodiments, the monitoring server 120 may be configured to receive data from a plurality of data sources with respect to cash inventory stored at a particular cash handling device, a particular POS terminal, and/or the like. For example, the cash handling device and/or POS terminal may provide data indicative of aggregate inputs and outputs of cash to the machine, while a user computing device may provide data indicative of how the aggregate inputs and outputs are divided among a plurality of retail tills (or registers, the terms being utilized herein interchangeably) (e.g., usable with respective POS devices). Accordingly, the monitoring server 120 may be configured to provide till-level inventory tracking configurations based at least in part on the aggregate amount of cash input to or output from a particular cash handling device and/or POS terminal, as well as manually generated data provided from a user computing entity indicative of how the cash was distributed from/to a various tills.

As indicated, in one embodiment, the monitoring server 120 may also include one or more communications interfaces 208 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the monitoring server 120 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1×(1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol. The monitoring server 120 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

Although not shown, the monitoring server 120 may include or be in communication with one or more input elements, such as a keyboard input, a mouse input, a touch screen/display input, motion input, movement input, audio input, pointing device input, joystick input, keypad input, and/or the like. In one embodiment, the monitoring server 120 may also include or be in communication with one or more output elements (not shown), such as audio output, video output, screen/display output, motion output, movement output, and/or the like.

As will be appreciated, one or more of the monitoring server's 120 components may be located remotely from other monitoring server 120 components, such as in a distributed system. Furthermore, one or more of the components may be combined and additional components performing functions described herein may be included in the monitoring server 120. Thus, the monitoring server 120 can be adapted to accommodate a variety of needs and circumstances. As will be recognized, these architectures and descriptions are provided for exemplary purposes only and are not limiting to the various embodiments.

Exemplary Mobile Device

In one embodiment, a user may be an individual, a representative of a customer, such as a company or organization, and/or the like who wants to deposit and/or withdraw cash from a cash handling device as discussed above. The user may interact with a cash handling device via a user interface thereon, and/or the user may interact with a mobile device 110 to obtain information/data regarding one or more accounts to which the user has access. As will be recognized, an account associated with a cash handling device may be any of a number of different account types, including a bank-owned cash account, a non-bank owned cash account, and/or the like. Accounts may be associated and/or linked with any of a variety of banking institutions holding accounts on behalf of a customer. Moreover, an account could be associated with more than one user (e.g., a plurality of employees associated with a customer holding an account), and each user may have different account access credentials (e.g., a first user may have withdrawal and deposit access and a second user may have deposit only access to an account). Moreover, each user may have access to an account via different access identifiers (e.g., different user identifiers), or in certain embodiments each user may have access to the account via an identical access number. In other embodiments, a single user identifier may be associated with more than one account (e.g., accounts associated with a plurality of departments within a commercial customer).

Figure 3:
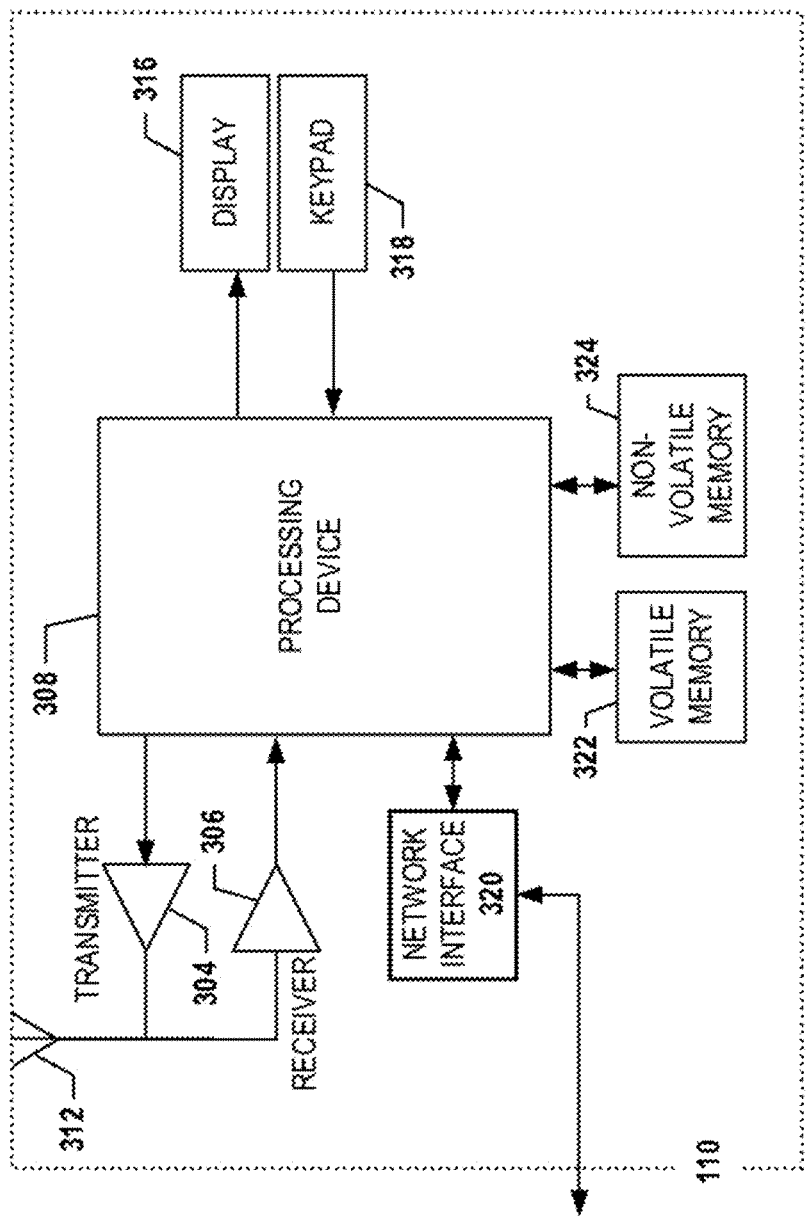
FIG. 3 schematically illustrates features of a handheld device according to certain embodiments.

The mobile device 110 includes one or more components that are functionally similar to those of the monitoring server 120. FIG. 3 provides an illustrative schematic representative of a mobile device 110 that can be used in conjunction with embodiments of the present invention. As noted previously, the terms device, system, computing entity, entity, server, and/or similar words used herein interchangeably may refer to at least, for example, one or more computers, computing entities, mobile phones, tablets, phablets, watches, glasses, ear pieces, wristbands, wearable items/devices, the like, and/or any combination of devices or entities adapted to perform the functions, operations, and/or processes described herein. As shown in FIG. 3, the mobile device 110 can include an antenna 312, a transmitter 304 (e.g., radio), a receiver 306 (e.g., radio), and a processing element 308 (e.g., CPLDs, microprocessors, multi-core processors, cloud processors, coprocessing entities, ASIPs, microcontrollers, and/or controllers) that provides signals to and receives signals from the transmitter 304 and receiver 306, respectively.

In one embodiment, the signals provided to and received from the transmitter 304 and the receiver 306, respectively, may include signaling information/data in accordance with air interface standards of applicable wireless systems. In this regard, the mobile device 110 may be capable of operating with one or more air interface standards, communication protocols, modulation types, and access types. More particularly, the mobile device 110 may operate in accordance with any of a number of wireless communication standards and protocols, such as those described above with regard to the monitoring server 120. In a particular embodiment, the mobile device 110 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the mobile device 110 may operate in accordance with multiple wired communication standards and protocols, such as those described above with regard to the monitoring server 120 via a network interface 320.

Via these communication standards and protocols, the mobile device 110 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). In one embodiment, the mobile device 110 can also download changes, add-ons, and updates, for instance, to its firmware, software (e.g., including executable instructions, applications, program modules), and operating system.

According to one embodiment, the mobile device 110 may include location determining aspects, devices, modules, functionalities, and/or similar words used herein interchangeably. For example, the mobile device 110 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). In one embodiment, the satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This information/data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the mobile device's 110 position in connection with a variety of other systems, including cellular towers, Wi-Fi access points, and/or the like. Similarly, the mobile device 110 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, Bluetooth Smart, Wi-Fi Direct transmitters, NFC transmitters, and/or the like. These indoor positioning aspects can be used in a variety of settings to determine the location of someone or something to within inches or centimeters.

In one embodiment, the mobile device 110 may also comprise a user interface (that can include a display 316 coupled to a processing element 308) and/or a user input interface (coupled to a processing element 308). For example, the user interface may be a user application, browser, user interface, interface, and/or similar words used herein interchangeably executing on and/or accessible via the mobile device 110 to interact with and/or cause display of information/data from the monitoring server 120, as described herein. The user input interface can comprise any of a number of devices or interfaces allowing the mobile device 110 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the mobile device 110 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

In certain embodiments, the user interface (e.g., the display 316) may be configured for displaying access credentials that may be presented to a cash handling device to enable the user to gain account access via the cash handling device. For example, the user interface of the mobile device 110 may be utilized to display a QR code, a bar code, an image, and/or the like that is machine-readable and indicative of the user's access credentials. Similarly, the mobile device 110 may be configured for storing access credentials thereon, and transmitting those access credentials via any of a variety of wireless data transmission protocols (e.g., Bluetooth, Wi-Fi, NFC, and/or the like) to the cash handling device to provide access credentials for the user to the cash handling device.

The mobile device 110 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DEVIM, SEVIM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the mobile device 110. As indicated, this may include a user application that is resident on the entity or accessible through a browser or other user interface for communicating with the monitoring server 120 and/or various other computing entities.

As will be recognized, the mobile device 110 may include one or more components or functionality that are the same or similar to those of the monitoring server 120, as described in greater detail above. As will be recognized, these architectures and descriptions are provided for exemplary purposes only and are not limiting to the various embodiments.

Cash Handling Device Hardware

Figure 4:
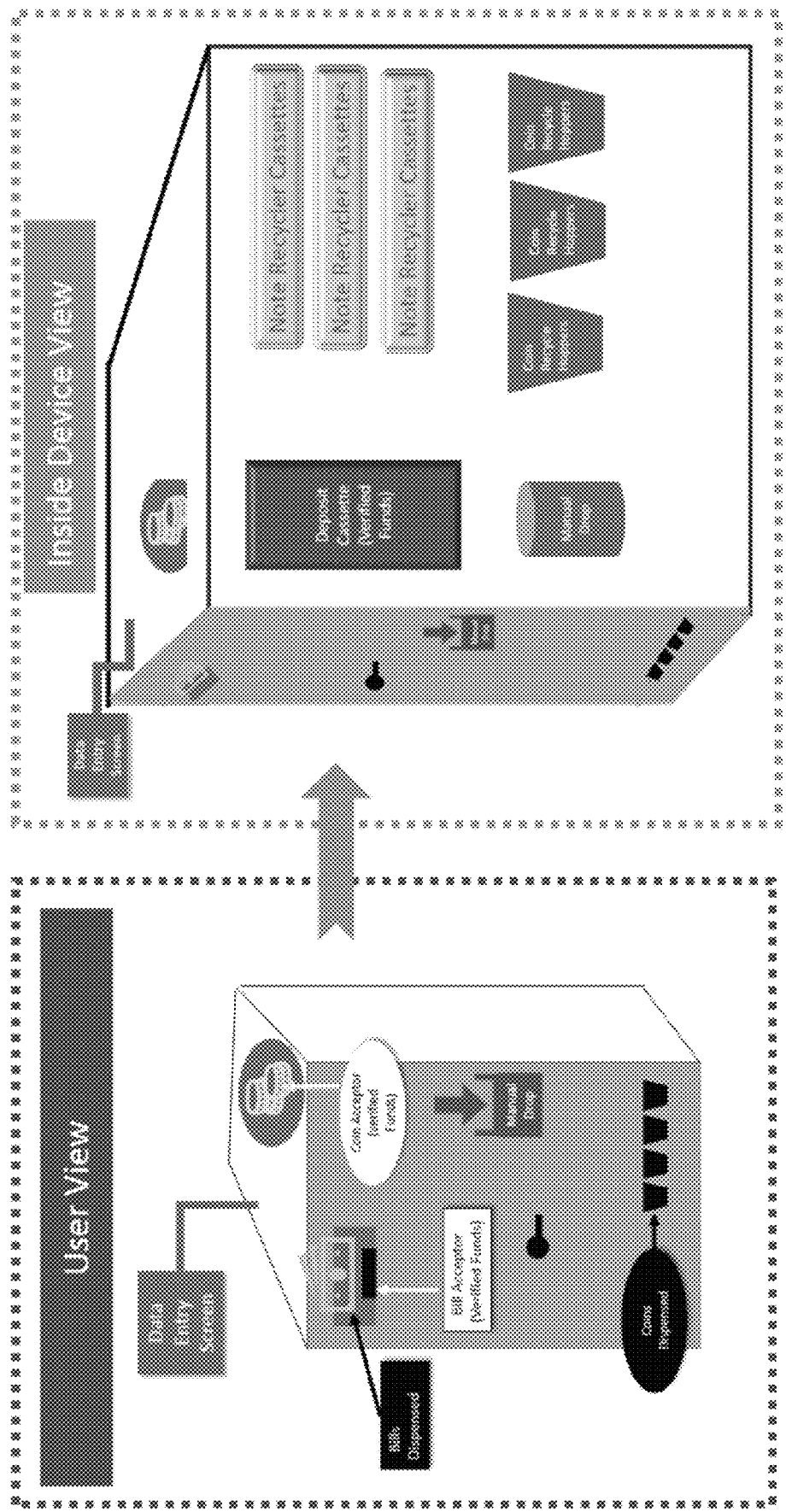
FIG. 4 schematically illustrates features of a cash handling device according to certain embodiments.

An example cash handling device is shown schematically at FIG. 4. As shown therein, components of the cash handling device are disposed within and/or on a housing. The cash handling device may comprise a user interface (e.g., an LCD monitor, a PIN-pad, and/or the like), one or more data readers (e.g., a card reader, a barcode reader, an NFC reader, a camera (which may also be utilized for recording security footage), a biometric reader, and/or the like). In certain embodiments, the cash handling device hardware may comprise one or more secure information storage areas configured to securely store user data (e.g., user identifiers, user passwords/passcodes, user biometric data, and/or the like) to prevent unauthorized access to such user data. These secure information storage areas may be accessible to certain authorized users, thereby enabling those authorized users to add or remove user data, for example, as new employees/users become authorized to interact with the cash handling device and/or as prior employees/users are no longer authorized to interact with the cash handling device.

The cash handling device may further comprise one or more currency outputs (e.g., a coin dispenser, such as a rolled coin dispenser or a loose coin dispenser, a note dispenser, such as a loose note dispenser or a bound-note dispenser, and/or the like), one or more currency and/or negotiable instrument inputs (e.g., a coin recycler, a check/note scanner/recycler, a deposit cassette, and/or the like), a receipt printer, and/or the like. As discussed herein, the cash handling device may additionally comprise a retail till receiving portion configured to receive a retail till during receipt and/or distribution of cash stored within the retail till. In certain embodiments, the retail till receiving portion may further comprise a retail till identifier scanner configured to obtain retail till identifier data for tills located therein, such that data indicative of cash added to and/or removed from the retail till may be associated with the retail till identifier.

The cash handling device components collectively enable a user (e.g., a representative of a particular commercial establishment customer having an account accessible via the cash handling device) to deposit and/or withdraw funds from the cash handling device (which may result in corresponding changes to an account balance in an account held at a particular banking institution for the commercial establishment), for example, when emptying or filling a retail till. In certain embodiments, the cash handling device may enable users to withdraw currency in requested quantities and denominations (e.g., requested quantities of each of a plurality of denominations). Users may interact with the cash handling device via the one or more user interface elements/mechanisms to (1) provide user identifying data (e.g., via the one or more data readers, the PIN pad, a touch screen, and/or the like), and (2) to provide data indicative of a requested transaction to be performed with the cash handling device.

In certain embodiments, a plurality of users may be associated with a single account with the cash handling device, and each of those users may be associated with differing account access levels. For example, a first user may have deposit and withdrawal access for a particular account, while a second user may only have deposit access for the particular account. Data indicative of the access credentials for each user may be stored locally in a non-transitory memory of the cash handling device, on a memory within a physical identification token (e.g., a card) carried by the user, and/or the like. For clarity, in embodiments in which a plurality of users have access to a single account, each of those users may still maintain separate sign-in credentials, such that each of the plurality of users may be distinguished from one another while using the cash handling device.

With reference to FIG. 4, which illustrates a schematic view of various components of a cash handling device according to one embodiment, the cash handling device may comprise one or more components of a note (e.g., note) circulation system and one or more components of a coin circulation system.

In the illustrated embodiment, the note circulation system encompasses a note acceptor configured for providing notes to a user and/or for accepting notes deposited by a user. The note acceptor may be configured for processing a plurality of notes simultaneously (e.g., presented to the note acceptor in a stack) to speed transactions with the user. Notes passed between the note acceptor and one or more note recycler cassettes and/or deposit cassettes (illustrated in FIG. 4) are counted, imaged, and/or otherwise verified to monitor the quantity of notes deposited/withdrawn, as well as the denomination of those notes. Through the verification mechanism of the note acceptor, the note circulation system may be configured to separate out negotiable instruments (e.g., checks) and/or certain notes for direction to separate storage locations, and/or to separate out and return unreadable notes and/or unreadable negotiable instruments to a user. In certain embodiments, those unreadable notes and/or unreadable negotiable instruments may be resubmitted by the user via a manual drop system, and the user may manually provide information regarding the denomination of the particular notes provided to the cash handling device via the manual drop.

As is particularly relevant for deposits, the note acceptor may be configured to segregate notes by denomination prior to providing those notes to a note recycler and/or deposit cassette. The segregated notes may be stored in separate storage locations (e.g., separated portions of a recycler cassette and/or separated portions of a deposit cassette) such that the notes may be easily recycled based on denomination for later transactions if needed. In certain embodiments, the separate storage locations may comprise separate deposit cassettes, separate recycler cassettes, and/or separated portions of a deposit cassette and/or recycler cassette. As a specific example utilized with U.S. currency, a cash handling device may comprise two cassettes (deposit cassettes, recycler cassettes, or both) configured for receiving and/or dispensing $1 bills, a third cassette (deposit, recycler, or both) configured for receiving and/or dispensing $5 bills, a fourth cassette (deposit, recycler, or both) configured for receiving and/or dispensing $20 bills, a fifth cassette (deposit, recycler, or both) divided into separate sections, a first section for receiving and/or dispensing $5 bills and a second section for receiving and/or dispensing $10 bills. A sixth cassette (deposit only) may be configured for receiving overflow of any denomination of note (including $1, $2, $5, $10, $20, $50, and $100) when a respective denomination-specific cassette is full and/or if no denomination specific cassette is provided for a particular note. For clarity, a cash handling device may comprise deposit only cassettes having the above-referenced configuration, recycler only cassettes having the above-referenced configuration (except for the deposit-only overflow cassette) or may have two sets of cassettes having the above-referenced configuration (e.g., a first set of deposit cassettes having the above-referenced configuration and a second set of recycler cassettes having the above-referenced configuration, but without the overflow cassette). It should be understood that the configuration of specific denomination-specific cassettes mentioned above is presented as an example only, and any combination of denomination-specific cassettes may be utilized.

In certain embodiments, all notes received from the note acceptor during deposit transactions are first directed to a note recycler cassette for storage therein. Notes may be redirected from a recycler cassette to a deposit cassette to remove those notes from circulation upon the occurrence of one or more trigger events, such as a quantity of notes (e.g., a quantity of a given denomination of notes) exceeding a threshold quantity or upon receipt of user input requesting that notes are moved to the deposit cassette. As discussed herein, the trigger event utilized to redirect notes from a recycler cassette to a deposit cassette may be dynamic, and may be adjusted based at least on part on cash usage models established and/or maintained at the monitoring server. For example, on a first day, a first threshold quantity of notes may be utilized as a trigger event for redirecting funds to a deposit cassette, and on a second day, a second threshold quantity of notes, different from the first threshold quantity of notes, may be utilized as a trigger event for redirecting funds to a deposit cassette. Thus, the model maintained at the monitoring server may adjust the amount of cash available for circulation within a retail environment based at least in part on factors considered in maintaining the applicable model.

Moreover, as discussed herein, movement of notes to a deposit cassette may itself be a trigger event for various tasks to be performed by the cash handling device or a networked monitoring system, such as transmitting data to a banking institution to direct funds into a particular account at the banking institution.

In certain embodiments, each time notes are moved within the cash handling device, the notes may pass through a quantity and/or denomination verification system to automatically monitor the amount of currency moving between the various portions of the cash handling device, thereby enabling the cash handling device to maintain an accurate count of the amount of currency in each denomination contained therein.

With reference now to the coin circulation system, the cash handling device may comprise a coin acceptor configured to accept coins deposited by a user of the cash handling device (e.g., accepting rolled coins and/or loose coins). The coin acceptor may have a rejection tray configured to return any unrecognizable coins deposited by the user. Moreover, the coin acceptor comprises a counting and/or verification system configured for counting the quantity and denomination of coins provided via the coin acceptor. Coins may then be passed to one or more coin recycle hoppers (e.g., which may comprise open trays, roll-creating hoppers, and/or the like) for storage within the cash handling device. In certain embodiments, those coin recycle hoppers may be configured for selectably dispensing coins as needed to fulfill a withdrawal request (e.g., as loose coins or as rolled coins). In such embodiments, the coins may be passed to one or more coin dispensing trays (e.g., coin roll dispensing trays or loose coin dispensing trays) for presentation to the user.

Like the note recyclers mentioned above, the cash handling device may comprise a plurality of denomination specific coin hoppers for storage of deposited coins. For example, a cash handling device may comprise two coin hoppers configured for storing $0.01 coins therein, another two coin hoppers configured for storing $0.05 coins therein, a fifth coin hopper configured for storing $0.10 coins therein, sixth and seventh coin hoppers configured for storing $0.25 coins therein, and an eighth, overflow coin hopper configured for storing coins of any denomination (such as $0.01, $0.05, $0.10, $0.25, $0.50, and $1). A cash handling device may comprise deposit only coin hoppers having the above configuration, recycler coin hoppers having the above configuration, or both recycler coin hoppers and deposit coin hoppers having the above configuration. Moreover, the configuration of denominations of coin hoppers discussed herein is provided merely as an example, any combination of denomination-specific coin hoppers may be utilized.

Moreover, the cash handling device may comprise a manual drop circulation system comprising a manual drop acceptor configured to accept notes and/or negotiable instruments provided by the user, and a manual drop storage cassette. The manual drop acceptor may operate in conjunction with the user interface, such that the manual drop may associate user-provided information regarding the quantity of a particular manual drop (e.g., value, quantity of a particular currency, and/or the like) with notes accepted via the manual drop. In certain embodiments, the manual drop cassette may be configured to separate each collection of notes accepted via the manual drop, such that the user-provided information regarding the quantity of currency provided via the manual drop may remain reflective of an amount of currency stored within a particular separated collection of notes. The manual drop may be a deposit only system, such that notes are not recycled to users from the manual drop cassette.

Although not shown, the cash handling device may be configured for automatically providing cash into a cashier tray (also referred to herein as a retail till) (e.g., a tray to be utilized with a cash register at a POS terminal). In such embodiments, the cashier tray may be supported within the cash handling device, and the cash handling device may selectably deposit quantities of notes and coins of select denominations into segmented portions of the cashier tray.

Moreover, the cash handling device comprises a receipt printer configured for printing physical receipts that may be usable by individual users and/or during change order processing as discussed herein.

The cash handling device may be configured such that at least a portion of the cash contained therein is bank-owned. This bank owned cash is not associated with any one or more customers' account(s), thereby enabling credits to be given to a user's account upon receiving a physical cash deposit at the cash handling device. Similarly, credit is not deducted from the user's account until and unless the user withdraws physical cash from the bank owned cash portion of the cash handling device.

In certain embodiments, the cash handling device is configured such that only a portion of the total cash contained within the cash handling device is bank-owned, and accordingly the cash handling device defines a plurality of cash storage locations therein, including at least one storage location for bank owned cash and another storage location for customer (depositor) owned cash. As just one example, bank owned cash may be stored within a deposit cassette (which may not define an outlet for cash), while cash within a note recycler and/or a coin recycler (having both deposit and withdrawal configurations) may remain depositor owned. In certain embodiments, the cash handling device comprises a verification mechanism for counting the quantity and value of notes being transferred into the deposit cassette or other storage location associated with bank-owned-cash. Accordingly, the cash handling device is configured to utilize only verified funds that have been specifically counted and valued via the verification mechanism for bank-owned-cash.

In certain embodiments, the cash handling device may be configured to enable deposits and withdrawals from bank owned cash portions by various users. Accordingly the bank owned cash portion of the cash handling device may encompass at least a note recycler (and/or a coin recycler), and may additionally comprise a deposit cassette in certain embodiments.

Cash Handling Device Controller

A cash handling device having the physical configuration discussed herein may have one or more onboard computing controllers configured for performing various functions and/or for controlling the functionality of various components of the cash handling device. In one embodiment, the cash handling device controller is embodied as a computing entity that may have a configuration similar to the mobile device 110 discussed above, and which may be configured to support processing in connection with deposit and withdrawal transactions for funds via the cash handling device. The one or more cash handling device controllers may include computing device(s) that are local to a corresponding cash handling device and/or computing device(s) that are remotely located. At least one of the cash handling device controllers may be configured to access and store information/data in at least one of one or more datastores to perform processing supported by the cash handling device.

As just one example, the cash handling device controller may be configured to monitor the amount of each of a plurality of denominations of cash that are dispensed and/or collected during a deposit or withdrawal transaction. When dispensing cash into a retail till, the cash handling device controller may store a till identifier for which dispensing is performed, and may store data indicative of the amount of cash (and the denominations of those distributions) dispensed into the retail till. Additional metadata associated with the transaction may also be stored, such as the date and/or time of dispensing, a user identifier associated with the transaction, and/or the like. The cash handling device controller may provide the stored data of the transaction to the monitoring server (e.g., by transmitting the transaction-specific data via a network) for further processing. Similarly, when receiving cash deposited from a retail till, the cash handling device controller may store a till identifier for which dispensing is performed, and may store data indicative of the amount of cash (and the denominations of those deposits) deposited from the retail till. Additional metadata associated with the transaction may also be stored, such as the date and/or time of dispensing, a user identifier associated with the transaction, and/or the like. The cash handling device controller may provide the stored data of the transaction to the monitoring server (e.g., by transmitting the transaction-specific data via a network) for further processing.

Exemplary POS Terminal

A POS terminal may be configured for receiving and/or dispensing cash during one or more transactions. A POS terminal may be embodied as a self-checkout (SCO) terminal, specifically configured for operation with/by a retail customer. Particularly for POS terminals configured for use in SCO implementations, the POS terminal limits user access to cash stored therein, by accepting cash via a cash acceptor mechanism (e.g., an acceptor slot) and dispensing cash via a cash dispensing mechanism (e.g., a dispensing slot).

In other embodiments, a POS terminal may be specifically configured for operation with/by a retail employee helping individual retail customers during transactions. The POS terminal may comprise one or more user interfaces (e.g., an LCD monitor, a PIN-pad, and/or the like), one or more data readers (e.g., a card reader, a barcode reader, an NFC reader, a camera (which may also be utilized for recording security footage), a biometric reader, and/or the like). In certain embodiments, the cash handling device hardware may comprise one or more secure information storage areas configured to securely store data, such as transaction data, cash content data, and/or the like.

The POS terminal may further comprise one or more currency outputs (e.g., a coin dispenser, such as a loose coin dispenser, a note dispenser, such as loose note dispenser, and/or the like), one or more currency intakes (e.g., a coin acceptor, a check/note scanner/acceptor, and/or the like), a receipt printer, and/or the like. The POS terminal may additionally comprise one or more cash recycler portions configured to store cash, separated by denomination, therein. The cash recycler portions may be configured to accept cash provided to the POS terminal and/or to dispense cash from the POS terminal, for example, as change to a customer during a transaction. As discussed herein, the cash recycler portion may be configured as a Last-In-First-Out configuration for each denomination, such that the most recently received bill for a particular denomination is the first bill to be dispensed during the same or a later transaction.

The POS terminal may comprise a note circulation system encompassing a note acceptor configured for providing notes to a user and/or for accepting notes deposited by a user. The note acceptor may be configured for processing a plurality of notes simultaneously (e.g., presented to the note acceptor in a stack) to speed transactions with the user. Notes passed between the note acceptor and one or more note recyclers may be counted, imaged, and/or otherwise verified to monitor the quantity of notes provided/withdrawn from the POS terminal, as well as the denomination of those notes.

As is particularly relevant for deposits, the note acceptor may be configured to segregate notes by denomination prior to providing those notes to a note recycler. The segregated notes may be stored in separate storage locations (e.g., separated portions of a recycler) such that the notes may be easily recycled based on denomination for later transactions if needed.

Moreover, the POS terminal may comprise a POS terminal controller configured for causing the POS terminal cash recycler to deposit and/or accept cash in applicable amounts for a particular transaction. In certain embodiments, the POS terminal controller may have a configuration similar to the cash handling device controller, such that the POS terminal controller comprises one or more non-transitory memory storage areas, one or more processors, one or more network connection mechanisms, and/or the like. Accordingly, the POS terminal controller may be in electronic communication (e.g., via a network) with the cash handling device controller, the monitoring server, and/or the like. Such network connections thereby enable the monitoring server to provide data directly to a POS terminal (and vice versa), for example, so as to update data representative of an amount of BOC contained within the POS terminal, and/or to update data enabling the POS terminal to distribute BOC during transactions.

Exemplary Networks

In one embodiment, any two or more of the illustrative components of the architecture of FIG. 1 may be configured to communicate with one another via respective communicative couplings to one or more networks 280. The networks 280 may include, but are not limited to, any one or a combination of different types of suitable communications networks such as, for example, cable networks, public networks (e.g., the Internet), private networks (e.g., framerelay networks), wireless networks, cellular networks, telephone networks (e.g., a public switched telephone network), or any other suitable private and/or public networks. Further, the networks 280 may have any suitable communication range associated therewith and may include, for example, global networks (e.g., the Internet), metropolitan area networks (MANs), wide area networks (WANs), local area networks (LANs), or personal area networks. In addition, the networks 280 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof, as well as a variety of network devices and computing platforms provided by network providers or other entities.

Transmissions over networks 280 may be "in the clear" or may leverage one of more of a variety of industry-standard or third-party security technologies implemented in any of the OSI layers used. If encryption is used, it may be symmetric or asymmetric (or implement a combination of the two, as in SSL/TLS, where the initial handshake uses asymmetric encryption in the exchange of symmetric keys, and subsequent transactions use symmetric encryption based on the previously exchanged symmetric keys). As will be recognized, process interaction over a network may be synchronous or asynchronous: synchronous—processes are coupled and include web services (e.g., SOAP), which may in turn leverage http(s); and various other remote procedure call (RPC), middleware protocols, industry-standard exchange formats (e.g., XML or JSON), and integration architectures (e.g., REST) and/or asynchronous—processes are decoupled and mechanisms include message queues and file transfers.

Example Operation

FIGS. 5-8 provide example flowcharts of example processes for providing users with display variations of user interfaces based on their determined competency, and FIGS. 9-24 provide example user interfaces that may be presented to a user of a cash handling device while completing an example workflow associated with the cash handling device.

As mentioned above, the examples discussed herein are provided specifically in the context of cash handling device operation, however it should be understood that certain embodiments may be provided to facilitate operation of other specially-configured computing devices and/or machinery. In certain embodiments, user interface screens may be generated and/or stored for selective operation (and display) locally at the cash handling device. In other embodiments, user interface screens may be generated and/or stored at a monitoring server and provided to the cash handling device for display in real-time as needed, based on a determination (made at the monitoring server) that a particular user interface display should be provided to the user via the cash handling device to facilitate completion of a particular workflow. For those embodiments in which user interface screens are generated locally at the cash handling device, the cash handling device controller may store computational instructions for executing machine-learning based models for generated user interfaces locally. In those embodiments in which user interface screens are generated remotely from the cash handling device, the computational instructions for implementing the machine-learning based models may be stored remotely from the cash handling device (e.g., at the monitoring server), to provide additional computing resources for executing the machine-learning based model.

User Identification

As mentioned above, various embodiments are configured to customize the various user interfaces for individual users, based at least in part on the determined capabilities of those users. Moreover, as mentioned, each user may have a corresponding unique identifier that the user is required to input to operate the cash handling device. By accepting the unique identifier prior to enabling use of the cash handling device, usage data generated at least in part on activity trackers (e.g., key trackers, mouse trackers, touch-screen trackers, and/or the like) is correlated with the user identifier, such that user-specific capabilities may be established, even for cash handling devices utilized by a plurality of users.

In certain embodiments, the user identifier may be associated with a user profile, which may be stored remotely from the cash handling device. The user profile of certain embodiments comprises user identifying data (e.g., a name, a photo, contact data, and/or the like. The user profile may additionally comprise generated use data (e.g., data generated by activity trackers as discussed herein). This use data may be raw use data, such as data generated directly by activity trackers, including timing data indicative of time between clicks/interactions with various user interfaces, data indicative of a quantity of clicks/interactions prior to successfully completing a task, and/or the like. In other embodiments, the use data may be embodied as a competency score, a competency classification, and/or the like, indicative of the user's competency in utilizing one or more user interface screens. The competency score for a particular user may encompass a plurality of competency scores, including a competency score for each of a plurality of user interfaces (e.g., wherein each competency score for a user is stored together with a user interface identifier). In other embodiments, a competency classification may be established for a user. In certain embodiments, the competency classification may comprise a plurality of competency classifications, including a competency classification established for each of a plurality of user interfaces. The competency classifications for particular user interfaces may each have an assigned display variation for the user interface, such that users having a particular competency classification are provided with the assigned display variation of the user interface while the user is using the cash handling device.

In certain embodiments, a competency classification may be established based at least in part on a determined competency score for a user. For example, a range of competency scores may correlate to a particular competency classification, such that users having a competency score falling within the range of competency scores are assigned the correlated particular competency classification.

Activity Trackers

To determine a user's capability and/or skill level in utilizing the cash handling device, the cash handling device controller incorporates one or more activity trackers for monitoring a user's interactions with the user interface screens of the cash handling device. These activity trackers may comprise key trackers for monitoring which keys of a user interface feature are pressed/selected by a user. In addition to tracking which keys are pressed, the key trackers may collect additional metadata regarding key interactions, such as a time stamp (e.g., having a milli-second level of precision) of when the key was pressed, a force with which the key was pressed (e.g., for user interface configurations having force-sensitive sensors), and/or the like. By tracking the keys pressed, the times when keys were pressed, and the force with which keys were pressed, the key trackers may provide an indication of whether a particular user had confidence in selecting a particular key, an indication of whether the particular user needed to press multiple keys before selecting a proper key, an indication of how quickly the user found the proper key, and/or the like.

In certain embodiments, the activity sensors additionally or alternatively comprise mouse/cursor trackers (if applicable) for tracking the movement of a cursor relative to a user interface. Tracking of the cursor may be accompanied by additional metadata collected by the mouse/cursor trackers, such as time stamps for indicating when a cursor was located at a particular location, indications of whether the user pressed a button on a mouse/cursor, timestamps associated with when the user pressed a button on a mouse/cursor, and/or the like. By tracking the location of a cursor as well as time stamps associated with cursor locations, the activity trackers may be configured to determine how quickly the user moves to a proper location on a user interface, whether the user moves the cursor in a direct path to a correct location on the user interface, whether the user moves the cursor on a circuitous path to the correct location on the user interface, whether the user moves the cursor to an incorrect location and depresses a selection button, and/or the like.

For touch-screen style user interfaces, one or more activity trackers may be utilized for monitoring when a user interacts with the touch screen, the type of interaction with the touch screen (e.g., a single finger, multiple fingers, a stylus, an incidental contact, and/or the like, a tap, a hold, a swipe (length, location, and direction), a pinch, and/or the like), a time stamp associated with each interaction, and/or the like. By monitoring these interactions with the touchscreen, the activity tracker may be configured to determine whether a user selects a proper location on the user interface, the amount of time between interactions with the touch screen, the amount of time between the display of a user interface screen and the user interacting with the proper location of the touch screen, whether the user utilized one or more gestures prior to interacting with the touch screen (e.g., a pinch-to-zoom gesture that may indicate the user would benefit from a larger font size), and/or the like.

It should be understood that other activity trackers may be utilized in certain embodiments, so as to provide additional or alterative insight into a user's interaction with various user interfaces. In certain embodiments, the results of activity trackers may be generated and/or stored within a user profile for each user interface displayed to the user. As discussed in greater detail herein, each user interface may comprise specific features tailored to an individual user, and therefore each user interface may vary between individual users. However, each user interface may still maintain a user interface identifier that may be correlated between users, thereby enabling comparisons between the effectiveness of various user interface organizations, feature emphasis in user interfaces, and/or the like between individual users. Moreover, the user interface identifiers enable storage of activity data for each of a plurality of user interfaces, and the user interface identifiers may be correlated with specific activity data sets for storage within the user profile.

Data stored within a user profile may change over time, such as to reflect a user's increasing comfort with certain user interfaces over time. In certain embodiments, a plurality of activity data sets may be stored for a single user interface identifier, thereby enabling a determination of the rate at which the user becomes comfortable with one or more user interfaces (e.g., based on decreased time spent on specific user interfaces over time, decreases in the number of incorrect button presses over time, and/or the like). In certain embodiments, a maximum number of activity data sets may be stored for each user interface, with each activity data set being generated during a single, continuous interaction with the user interface (e.g., the uninterrupted length of time that the user interface is displayed to the user). The activity data sets stored in the user profile may be stored on a rolling-basis, under a first-in-first-out storage configuration. Thus, only the most recent activity data sets may be stored for the user profile (e.g., the most-recent 10 activity data sets). In other embodiments, only a single activity data set may be stored for a particular user profile, such as the most-recently generated activity data set.

Model Generation

Machine-learning based models may be generated to determine an appropriate display variation of one or more user interfaces to be provided to a user in response to a request for a user interface (e.g., a request for a user interface may be generated and/or provided by or on behalf of a cash handling device, such as after a user interacts with a particular user interface screen in a manner that causes the cash handling device to display subsequent user interface). In certain embodiments, each display variation may have a corresponding unique display variation identifier, thereby enabling the system to identify and retrieve the appropriate display variation for a particular user interface to be displayed to a user. It should be understood that additional metadata beyond the display variation identifier may be stored together with the display variation, such as a difficulty classification for the display variation, a user interface identifier (which may be a part of the display variation identifier in certain embodiments), and/or the like.

Machine-learning based models may be generated to be applicable to individual user interfaces (and the machine-learning models may be correlated with user interface identifiers), so as to address circumstances where one or more users may be particularly adept at navigating a subset of the total number of user interfaces, but may struggle to navigate a second subset of the total number of user interfaces. In other embodiments, a single model may be applied to address all user interfaces. The single model may enable a selection between a plurality of complete sets of user interfaces (e.g., a first set of user interfaces is designed for users of a lower competency-level and a second set of user interfaces is designed for users of a higher competency-level) for presentation to a user. In other embodiments, the single model may be configured to distinguish between user interfaces that a user struggles to use and user interfaces that the same user is adept at using. For example, the single model may be configured to determine difficulty scores to be assigned to each user interface and/or display variation of a user interface, and corresponding user interface identifier (e.g., based at least in part on an aggregate training data set encompassing activity data from a plurality of users that indicates which user interfaces users, on average, spend more time, more unnecessary clicks, and/or the like to address). Based at least in part on the determined correlations between a user's competency level and the difficulty scores for particular user interfaces (and display variations thereof), the model may determine which user interfaces should be displayed with a layout/set-up designed for low-competency users, and which user interfaces should be displayed with a layout/set-up designed for high-competency users. It should be understood that while the foregoing examples are discussed in terms of a binary selection of "low-competency" or "high-competency" user interfaces, it should be understood that any number of user interface layouts/formats may be provided for varying skill levels.

Figure 5:
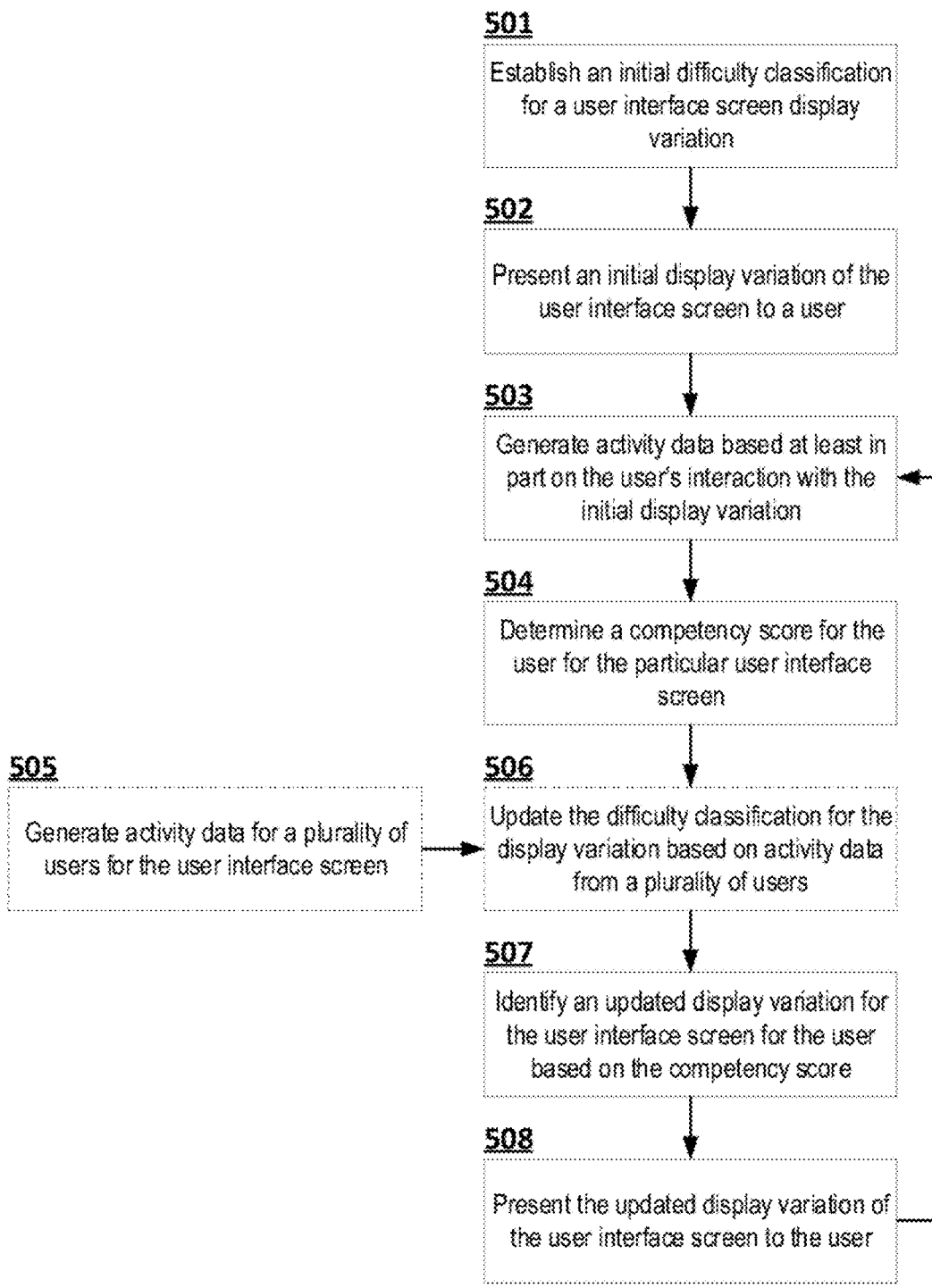
FIG. 5 is a flowchart illustrating an example process for providing user interfaces to a user via a machine-learning based selection of user interfaces, according to certain embodiments.
Figure 9:
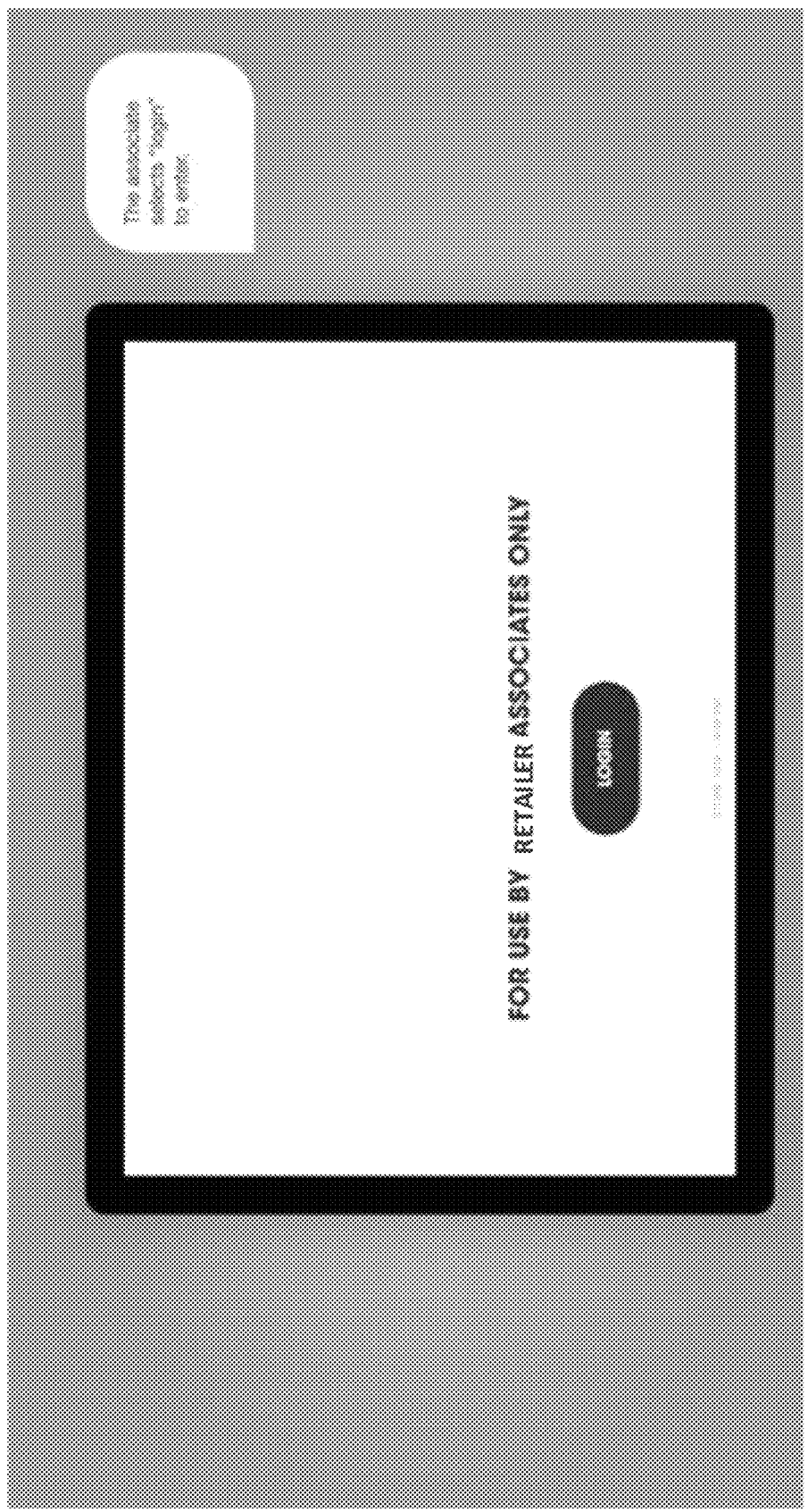
FIGS. 9-24 illustrate graphical user interface examples provided in accordance with certain embodiments.
Figure 10:
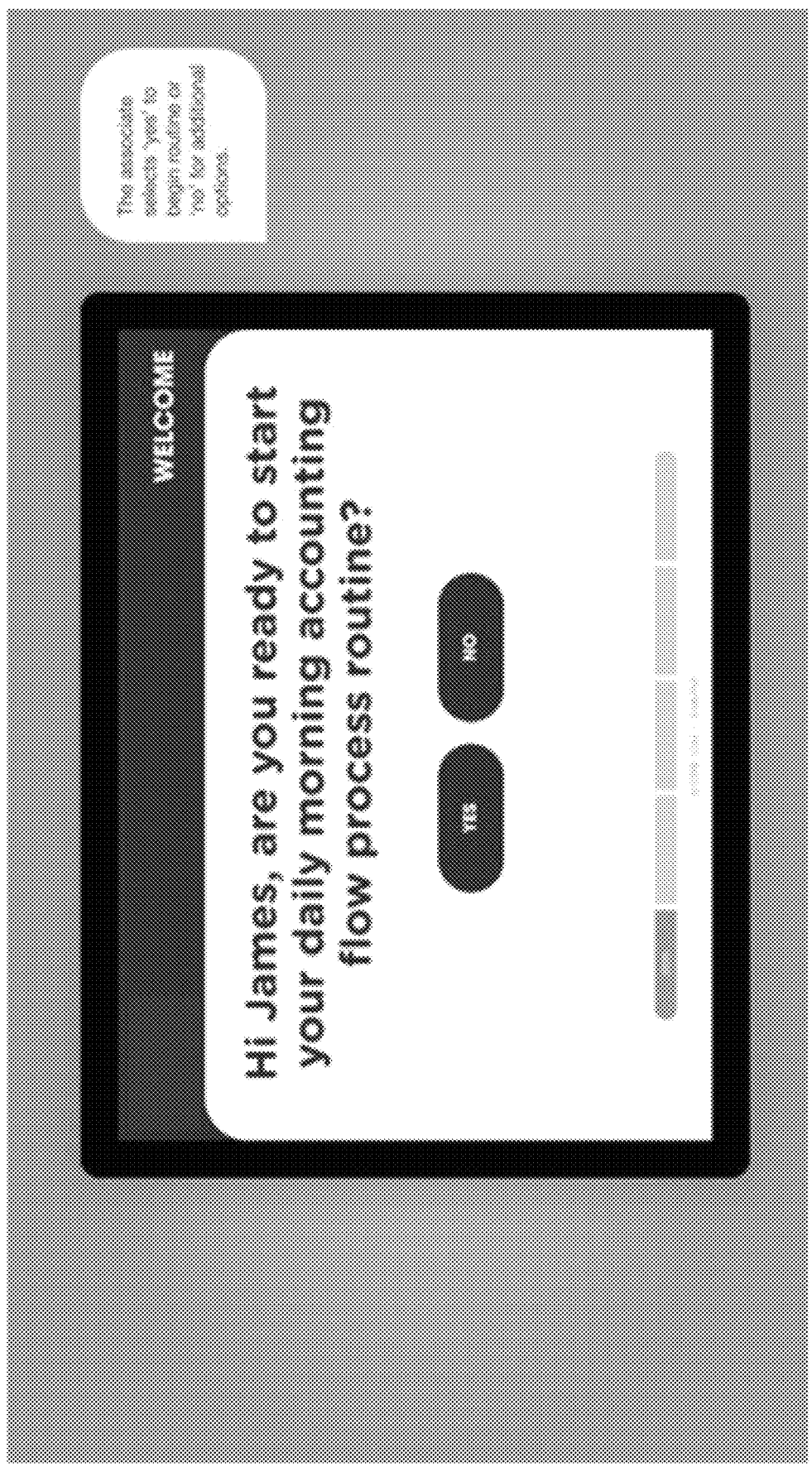

FIG. 5 is a flowchart describing an example model generation configuration for generating a single model for each user interface. As mentioned above, each user interface may be associated with a user interface identifier, such that display variations of user interfaces displaying the same information may be correlated (via the user interface identifier), even if those display variations are provided with vastly different layouts, formats, aesthetics, and/or content for different users. In certain embodiments, the user interface identifier may form a part of a unique display variation identifier for a particular display variation. For example, FIG. 9 illustrates a log-in page to be displayed to all users. The screen shown in FIG. 9 may have a user interface identifier of "SCREEN 0"— although it should be understood that this alphanumeric identifier is merely one example, and any other identifier may be utilized. As another example, the screen shown in FIG. 9 may have a display interface identifier of "SCREEN 0-1." Moreover, because the welcome screen shown in FIG. 9 is displayed prior to a user signing in, it should be understood that a single version of this welcome screen is needed for a particular device, as all users will see the same screen. FIG. 10 is the first example user interface shown that may having multiple display variations that may be alternatively displayed to a user. The user interface screen shown in FIG. 10 (as well as any other related display variations) may have a user interface identifier of "SCREEN 1." As another example, the user interface screen shown in FIG. 10 may have a display variation identifier of "SCREEN 1-1." While minimal information is displayed in the example user interface of FIG. 10, variations on the information displayed (or whether the screen is shown at all) may still be provided for different users. For example, a highly skilled user may not need to see the user interface of FIG. 10 at all, because the user is aware that he/she would only sign-in to the cash handling device if he/she was ready to begin the particular process. Thus, a user-interface specific model generated for the screen of FIG. 10 may determine whether activity data for a user demonstrates signs of impatience or extreme familiarity with the screen of FIG. 10, such as identifying repeated fast button-clicking in the approximate location of the selection button for "YES," even before the user interface screen has fully loaded. By contrast, activity data indicating the user takes a long time (e.g., more than an average amount of time, more time than 66% of users take, and/or the like), indicating the user moves a cursor between the two buttons multiple times before selecting one, indicating the user takes a circuitous path with the cursor to selection of a particular button, and/or the like, may indicate that the user is unfamiliar with the overall system and/or may require more detailed explanations of the steps needed for the displayed user interface. Those more detailed explanations may be implemented through additional text, through other audio/visual indicators/overlays that may be provided over certain portions of the display screen (e.g., emphasizing a button and/or providing an explanation of the functionality of the particular emphasized button). It should be understood that any of a variety of strategies for providing additional explanation may be implemented, and in certain instances a plurality of available strategies may be implemented selectively, based on the result of models that may indicate a most-effective strategy for display of data to a user.

To generate a model, activity data may be collected from a plurality of users for a particular user interface screen (i.e., activity data generated by a user while the user is viewing a particular user interface). This activity data may be utilized as training data. Moreover, one or more display variations of the user interface may be provided to the model as well, and in certain embodiments, each of these display variations may be correlated with one or more indications of whether the variation is designated for proficient users, low-competency users, moderate-competency users, average users, high-competency users, and/or the like (these characterizations being provided merely as an example, other classifications may be utilized in other embodiments). It should be understood that the classifications of specific available display variations may be provided as an initial classification only, and the model may ultimately assign different classifications as feedback data is provided, indicating whether the initial assignment was correct or incorrect. The machine-learning configuration may utilize the training data to identify similarities and differences between users to classify users into varying levels of competency in using the particular user interface screen. In some embodiments, a supervised training configuration may be utilized, with administrators indicating whether a particular set of activity data within the training data set is indicative of a particular level of competency. In other embodiments, an unsupervised training configuration may be utilized, with the machine-learning configuration distinguishing between different classifications without external input from an administrator. Under either supervised or unsupervised configurations, the model assigns a particular display variation to a particular user based on the machine-learning based classifications. After generating a model capable of classifying users based at least in part on the generated activity data by using machine learning with the training data, the resulting model may be utilized for individual users to determine appropriate display variations to be utilized with particular users based on the activity data generated by those users.

Moreover, over time, the users' later interactions with the user interface having various display variations may be provided to the model for model refinement as feedback data. Utilizing the feedback data, the classifications assigned to the various display variations may be updated to reflect user classifications that most- (and least-) benefit from the display variations, such that a best display variation may be provided for a user to minimize errors and to increase efficiency of the user using the user interface screen.

With reference specifically to FIG. 5, the overall process of assigning a display variation to a user is provided based at least in part on difficulty classifications generated (and updated) for specific display variations of a user interface, activity data generated for a user on a particular user interface screen, and/or a machine-learning model generated and maintained for a particular user interface screen. As indicated at Block 501, an initial difficulty classification is provided for each available display variation for a particular user interface. The difficulty classifications may be embodied as a difficulty score (e.g., selected from a plurality of discrete available scores; identified along a difficulty scale, and/or the like), an alphanumeric difficulty identifier, and/or the like, which may be stored as metadata together with the display variation identifier and the display variation. As discussed herein, the difficulty classification of a display variation may be utilized for assigning a particular display variation to a user based at least in part on a user's competency in utilizing a particular user interface. Moreover, an initial difficulty classification may be provided manually to each display variation, and the initial difficulty classification may be replaced and/or updated automatically, as the machine-learning based model is updated.

For those users for which activity data has not been previously generated (e.g., new users, or users that were recently granted access to additional user interface screens), the system presents an initial display variation to the user when the user first interacts with the cash handling device to work through an operating procedure, as reflected at Block 502. For example, the initially displayed display variation may encompass a display variation provided for users having low-determined competency and/or for new users (e.g., new users of the cash handling devices, or users who recently received additional access to features of the cash handling device). As the user interacts with the initially displayed display variation, activity data is generated by activity trackers that is indicative of the user's interactions with the user interface display variation, as reflected at Block 503. For example, the activity data generated for a user may be stored together with data indicative of the display variation identifier for which the activity data was generated.

The activity data is utilized to determine a competency score for the user, as reflected at Block 504. For example, the raw activity data is provided as input to the machine-learning model discussed above for the particular user interface. The activity data may be provided together with a display variation indicator that uniquely identifies the particular display variation provided to the user, such that the activity data is provided with context of which display variation was provided to the user.

In certain embodiments, the raw activity data and the display variation identifier is utilized as training data to retrain the machine-learning model and/or to automatically reclassify the difficulty classification of the display variation. As shown at Blocks 505-506, activity data from multiple users may be utilized to update the difficulty classification of the display variation, such as via the machine-learning model.

As shown at Block 507, the activity data for the user (along with difficulty classifications for particular user interface display variations) is utilized to determine which display variation for the user interface will be provided to the user when the user next encounters the particular user interface. For example, when the user next logs-in to the cash handling device to complete the procedure that includes the particular user interface. The machine-learning based model may determine that the user's activity data indicates that the same display variation of the user interface should be displayed to the user during a next interaction of the user with the user interface. Under other circumstances, the machine-learning based model may determine that a different display variation may be more appropriate for the user (e.g., a display variation having a difficulty classification indicating the display variation is more appropriate for more advanced users (e.g., users having higher competency scores)). In certain circumstances, upon determining that at least one user interface should be updated to provide a new display variation for the user, the system may be further configured to provide a notification user interface (e.g., to be displayed immediately after the user signs-in) that indicates that at least one user interface has changed. Thereafter, when the user encounters the user interface via the cash handling device (e.g., by the cash handling device generating a request for the user interface, such as after the user completes user input on a prior user interface), the cash handling device displays the updated display variation to the user, as indicated at Block 508. The process returns to Block 503 with the generation of activity data for the user, and the display variation for the user may be again updated based on the newly generated activity data.

Figure 6:
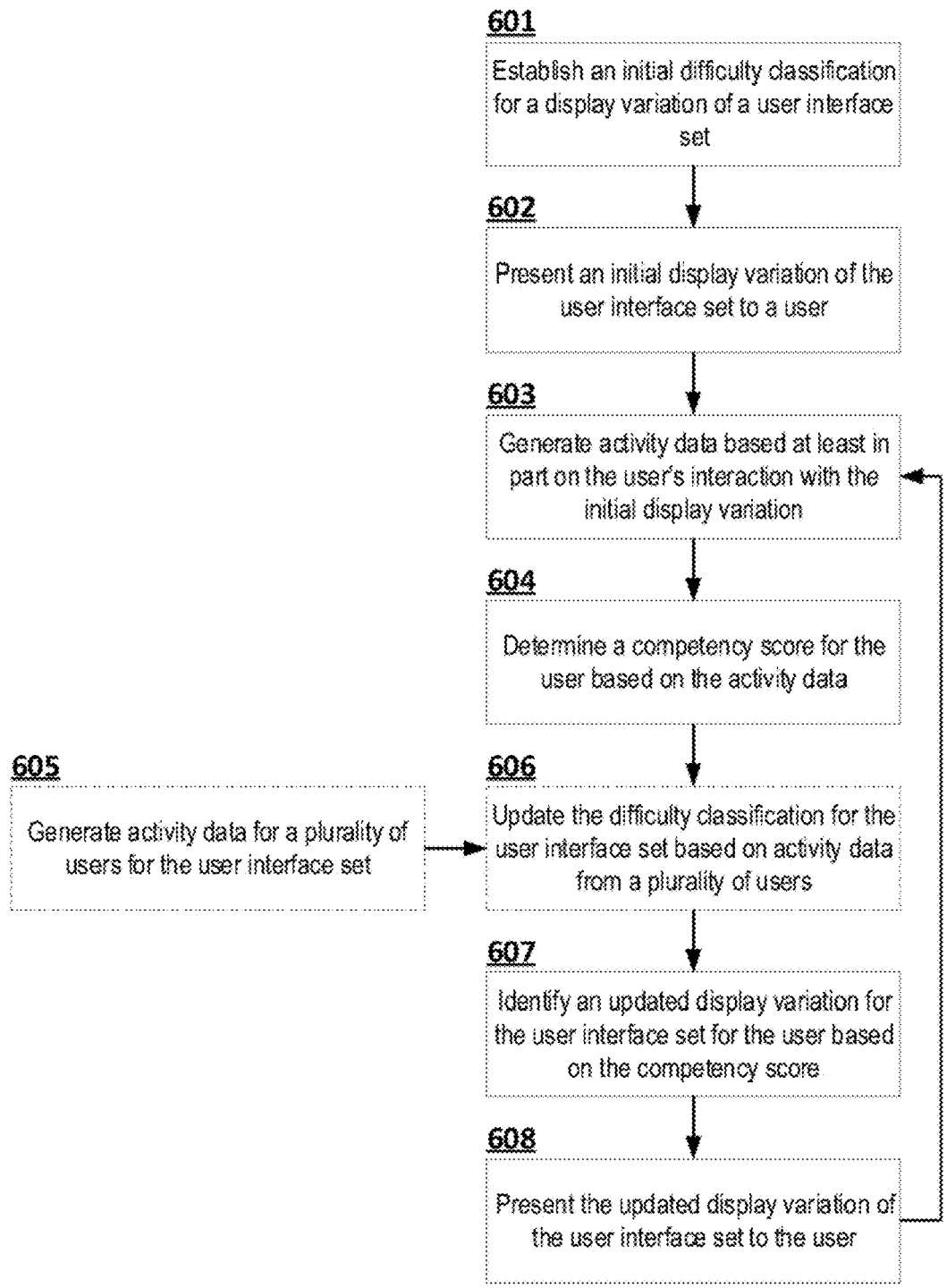
FIG. 6 is a flowchart illustrating an example process for providing a user interface set to a user via a machine-learning based selection of user interfaces, according to certain embodiments.

FIG. 6 provides another example flowchart demonstrating a process for generation and use of a single model for providing a user with a particular set of user interfaces. For example, various display variation user interface sets may be provided (each being a complete user interface set such that only a single set is necessary for selection for display to a user). In certain embodiments, each display variation set may have a corresponding display variation set identifier that may uniquely identify the display variation relative to other display variations of the same user interface set. In certain embodiments, each user interface screen within a particular display variation may have an additional unique identifier. In certain embodiments, the identifier for a particular user interface screen may include the display variation set identifier and/or the user interface set identifier.

For generation of a model for selection of a particular display variation set of a plurality of display variation sets for display to a user, a training data set encompassing activity data from a plurality of (e.g., all) user interfaces for each of a plurality of users is utilized. While the activity data included within the training data may be correlated with the above-mentioned user interface identifiers (thereby providing additional data that may be utilized to classify/distinguish between users and their corresponding activity data characteristics), in certain embodiments, the activity data need not be correlated with a user interface identifier when generating a model for selection of an overall, complete user interface set for display to a user.

In a manner similar to that discussed above in reference to generating models specifically for each of a plurality of user interfaces, the generation of a model for an overall user interface data set utilizes the training data encompassing activity data for a plurality of users, and each of the plurality of user interface sets may be provided with an initial classification (e.g., a level of difficulty) that may be correlated with classifications determined for each user (e.g., classifications indicative of a level of difficulty that the user is capable of handling), in a manner analogous to that discussed above in reference to assigning a user interface to a user via a user interface-specific machine-learning based model. Thus, based on the user's level of competency (e.g., provided as a competency-score for the user), the machine-learning model is trained to assign a display variation set to the user having a difficulty level appropriate for the user's level of competency. Moreover, these classifications assigned to the various user interface sets may be provided as an initial classification only, and the model may ultimately assign different classifications as feedback data is provided, indicating whether the initial assignment was correct or incorrect.

The machine-learning configuration may utilize the training data to identify similarities and differences between users to classify users into varying levels of competency in using the overall set of user interface screens (e.g., based at least in part on competency scores generated for users). In some embodiments, a supervised training configuration may be utilized, with administrators indicating whether a particular set of activity data within the training data set is indicative of a particular level of competency. In other embodiments, an unsupervised training configuration may be utilized, with the machine-learning configuration distinguishing between different classifications without external input from an administrator. Under either supervised or unsupervised configurations, the model assigns a particular display variation user interface data set to a particular user based on the machine-learning based classifications. After generating a model capable of classifying users based at least in part on the generated activity data by using machine learning with the training data, the resulting model may be utilized for individual users to determine appropriate display variations to be utilized with particular users based on the activity data generated by those users.

Moreover, over time, the users' later interactions with the various display variations of the user interface sets may be provided to the model for model refinement as feedback data. Utilizing the feedback data, the classifications assigned to the various display variations of user interface sets may be updated to reflect user classifications that most- (and least-) benefit from the display variations, such that a best display variation may be provided for a user to minimize errors and to increase efficiency of the user using the overall set of user interface screens.

As examples, the differences between display variations of user interface screens of the various user interface screen sets may vary in the amount of textual description provided on each screen, the level of audio/visual emphasis applied to various features displayed in each of the plurality of user interface screens of each user interface screen set, and/or the like. In certain embodiments, content of certain user interface screens may be divided into multiple user interface screens for certain user interface screen sets, so as to simplify the amount of content provided on a single screen. In such instances, each user interface screen may be provided with a user interface identifier indicative of the status of containing a partial amount of data that would be typically displayed on a single screen. For example, if a user interface screen having a complete set of data has a user interface identifier of "SCREEN 1," then a user interface screen having a partial set of data may have a user interface identifier of "SCREEN 1.1," "SCREEN 1.2," "SCREEN 1.3," and/or the like.

With specific reference to the flowchart of FIG. 6, selecting and updating a user interface set for display to a particular user begins with the establishment of an initial difficulty classification for each display variation of a user interface set, as indicated at Block 601. A user interface set may encompass all user interfaces needed to complete a particular task, process, and/or the like (e.g., all user interfaces necessary to complete a morning check-in routine; all user interfaces necessary to complete an end-of-shift routine, and/or the like). The display variations may encompass display variations for one or more user interfaces within the user interface set. The initial difficulty classification may be assigned manually (e.g., by an administrative user), although the initial difficulty classification may be later updated automatically, as discussed herein.

As indicated at Block 602, the process continues by presenting an initial display variation of a user interface set to a user. For new users for which no activity data has been previously generated and/or for users who recently who were recently granted additional access to features of the cash handling device (and the corresponding user interface screens), the initially displayed display variation of a user interface set may be a display variation for new users and/or for users with low competency scores. As the user works through the user interface set, activity data is generated, as reflected at Block 603. The activity data reflects the user's interactions with specific user interfaces of the user interface set, and the activity data is generated by activity trackers, as discussed herein.

As shown at Block 604, a competency score is generated for the user based at least in part on the generated activity data. In certain embodiments, the competency score is generated at least in part via a machine-learning based model that generates competency scores reflective of the user's capability of interacting with one or more user interfaces. The competency score may later be utilized for selecting an appropriate display variation of a user interface set for a particular user.

It should be understood that activity data from a plurality of users may be generated and utilized by the machine-learning model to update a difficulty classification automatically for one or more display variations, as reflected at Block 605-606. The updated difficulty classification of the display variations may be utilized to more accurately determine how to assign various display variations to different users, and the updated difficulty classification reflects users' actual interactions with the various display variations, so as to reflect whether users with high competency-scores or users with low-competency scores are more successful in utilizing the particular display variation of user interface screens.

As mentioned, the machine-learning based model determines a most-appropriate display variation of a user interface set for display to a particular user, as reflected at Block 607. The machine-learning based model may utilize the generated competency score for the user as well as difficulty classifications for each display variation of the user interface sets, to determine a most appropriate display variation for use with the user. In certain embodiments, when the machine-learning model determines that the display variation to be utilized with the user should change (such that the chronologically next time the user interacts with the user interface set, a new display variation of the user interface set is utilized), the system may be configured to provide the user with a notification (e.g., to be displayed immediately after the user logs in) reflecting that the user interface set will look different to the user as compared with the previous time the user interacted with the user interface set. Thereafter, the system presents the updated display variation of the user interface set to the user, as reflected at Block 608.

Figure 7:
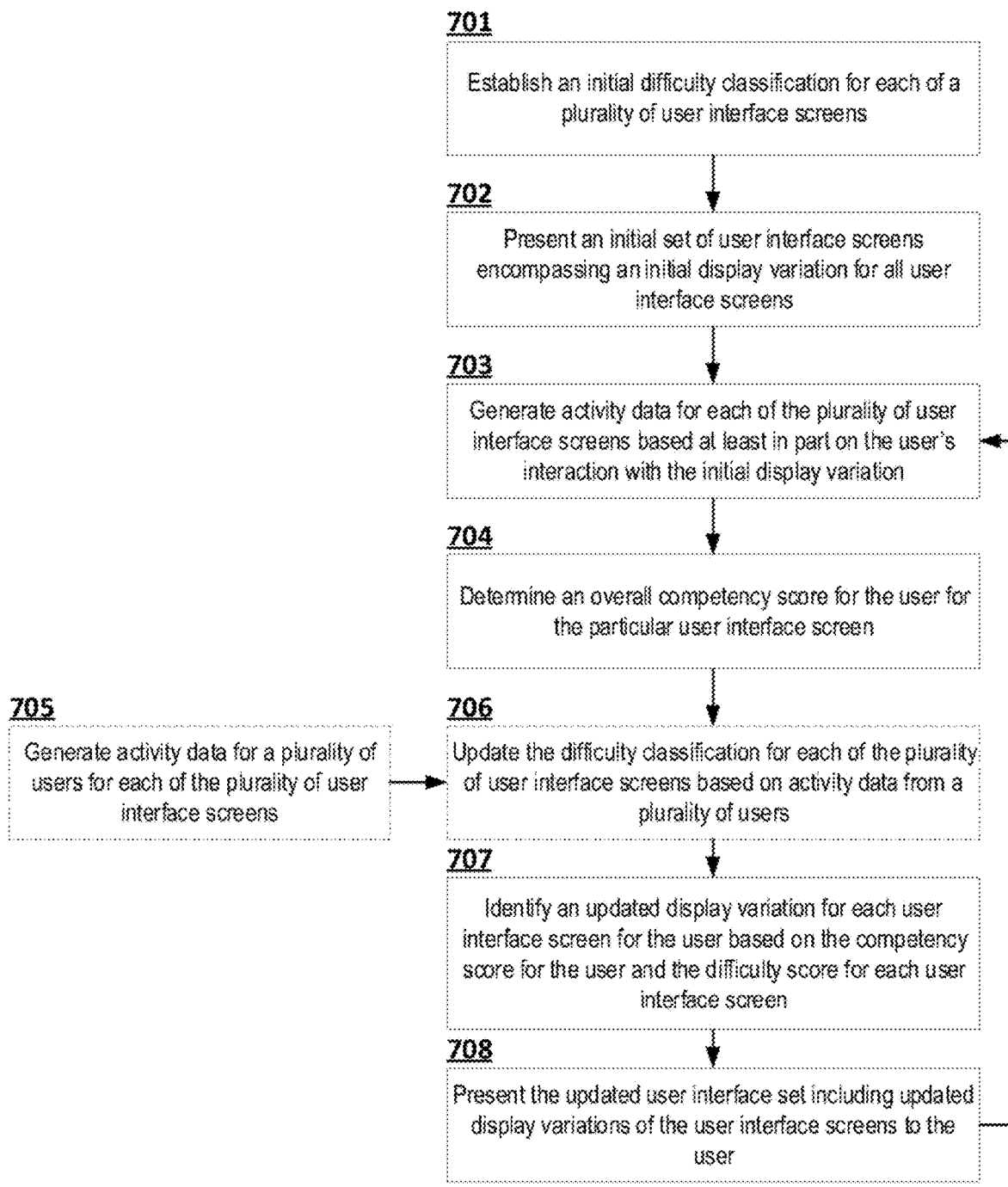
FIG. 7 is a flowchart illustrating an example process for generating and providing a user interface set to a user via a machine-learning based selection of user interfaces, according to certain embodiments.

FIG. 7 provides another example flowchart demonstrating a process for generation and use of a single model for proving a user with a complete set of user interfaces, and in which individual user interface screens may be modified and/or substituted based at least in part on a difficulty scoring model that may assign difficulty scores to individual user interface screens. The model for generating and/or assigning a set of user interface screens to a user may determine a user's capability of utilizing various user interface screens having different difficulty scores. For example, for those user interface screens having a high difficulty score (e.g., above a difficulty score threshold determined for a particular user, based on the user's capability to utilize scored user interfaces), a display variation with additional instructions or other explanatory features may be provided to the user. However, those user interfaces falling below the difficulty score threshold for the user may be provided with a more advanced display variation to enable the user to move more quickly through those user interfaces.

For generation of a model for generation and/or selection of a particular set of user interface screens utilizing difficulty scoring for each of the user interface screens, a training data set encompassing activity data from a plurality (e.g., all) user interfaces for each of a plurality users is utilizing. The training data set correlates the activity data to a user interface identifier, thereby enabling the machine-learning configuration to identify the user interfaces on which individual users spent additional time (or for which the activity data indicates that individual user had more difficulty in completing). Therefore, the activity data within the training data set may be utilized by the machine-learning configuration to ascertain, at least in part, a level of difficulty that a user is capable of handling based at least in part on a determination of which user interfaces the user was able to address without difficulty, and the levels of difficulty associated with each user interface.

The generation of a model for an overall user interface data set that incorporates difficulty scoring for individual display variations of user interfaces utilizes the training data encompassing activity data for a plurality of users, and each user interface screen may be provided with an initial classification indicative of the level of difficulty of completing the corresponding user interface (as indicated at Block 701 of FIG. 7). The initial classification of a level of difficulty for the display variation of the user interface screen may be provided manually by an administrator, however the machine-learning model may be configured to automatically update the level of difficulty classification for each display variation of a user interface screen over time, based on feedback data. The difficulty classifications for each display variation of a user interface screen may be correlated with classifications determined for each user (e.g., classifications indicative of a level of difficulty that the user is capable of handling), in a manner analogous to that discussed above in reference to assigning a display variation of a user interface to a user via a user interface-specific machine-learning based model. Thus, based on the user's level of capability, the machine-learning model is trained to assign a display variation for a user interface set having a combination of display variations of individual user interfaces that are tailored to the user's capability.

Activity data generated to reflect the user's interactions with various user interfaces is utilized for assigning particular display variations to a particular user. However, for new users (users for which no activity data has been generated), an initial user interface set encompassing user interfaces of an initial display variation (e.g., a display variation provided specifically for new users and/or for users with low competency scores) may be presented to the user, as reflected at Block 702. As the user interacts with the initial user interface screens, activity trackers generate activity data for the user as shown at Block 703. The system may then execute a machine-learning based model to determine a competency score for the user based at least in part on the generated activity data, as shown at Block 704. As the user interacts with the user interface set over time (e.g., over the course of multiple, discrete interactions), the competency score may change, such as to reflect the user's increasing competency with the user interface set, which is embodied within activity data generated during later interactions with the user interface set. The user's increased competency may be reflected within an increased competency score, which may, in turn, result in changes in the display variations of specific user interfaces to be presented to a user. To ensure the user is comfortable and/or expecting the changed layouts provided by the updated display variations, a notification may be generated and provided to the user via the display of the cash handling device (e.g., immediately after log-in) to inform the user that one or more user interfaces may appear different as the user works through the collection of user interfaces of a particular user interface set.

The machine-learning configuration may utilize the training data to identify similarities and differences between users to classify users into varying levels of competency in using the overall set of user interface screens. In some embodiments, a supervised training configuration may be utilized, with administrators indicating whether a particular set of activity data within the training data set is indicative of a particular level of competency. In other embodiments, an unsupervised training configuration may be utilized, with the machine-learning configuration distinguishing between different classifications without external input from an administrator. Under either supervised or unsupervised configurations, the model assigns a particular display variation for each user interface within a user interface data set to a particular user based on the machine-learning classifications. After generating a model capable of classifying users based at least in part on the generated activity data by using machine learning with the training data, the resulting model may be utilized for individual users to determine appropriate display variations to be utilized with particular users based on the activity data generated by those users.

Moreover, over time, the users' later interactions with various display variations of the user interfaces may be provided to the model for model refinement as feedback data. Utilizing the feedback data, the classifications assigned to the various display variations of user interfaces may be updated to reflect user classifications that most- (and least-) benefit from the display variations, such that a best display variation may be provided for a user to minimize errors and to increase the efficiency of the user using the overall set of user interface screens. As specifically reflected at Blocks 705-706, activity data may be generated for a plurality of users, and the activity data for the plurality of users may be utilized by a machine-learning based model to update the difficulty classification for each of a plurality of display variations and/or user interface screens, so as to provide more accurate determinations of user competency scores and/or to provide more accurate assignments of display variations to individual users, such users are provided with display variations that maximize the users' efficiency in interacting with the cash handling device.

In certain embodiments, a competency score may be utilized to establish a threshold difficulty classification for selection of display variations for the user. The competency score may thus indicate that display variations below a particular threshold should be utilized with the user, and for each user interface within the set of user interfaces, a display variation is selected that satisfies the applicable threshold for the user. For example, the display variation having the highest difficulty classification that falls below the threshold for the user is selected for display to the user. Display variations for each of a plurality of user interfaces within the user interface set are selected for display to the user, as reflected at Block 707-708.

As an example, a user interface screen having a screen identifier of "SCREEN 3" may have a plurality of available display variations that may be provided to a user in the alternative. A first display variation may have a difficulty classification above a threshold for a particular user, a second display variation may have a difficult classification below the threshold for the particular user, and a third display variation may have a difficulty classification below the second display variation. When determining which of the three display variations to provide to the user for the particular user interface, the system selects the second display variation as being the most difficult display variation that falls below the threshold established for the particular user. For example, the second display variation may have more instructions than the first display variation, but may not have time-delayed annotations added to the display (which may constitute a part of the third display variation). As another example, the third display variation may encompass a plurality of user interfaces having partial data content thereon (e.g., breaking up the "SCREEN 3" user interface into 3 separate user interface screens encompassing "SCREEN 3.1," "SCREEN 3.2," and "SCREEN 3.3") so as to simplify the data provided to the user on a particular user interface screen.

Updating Device Software and Related Training

Figure 8:
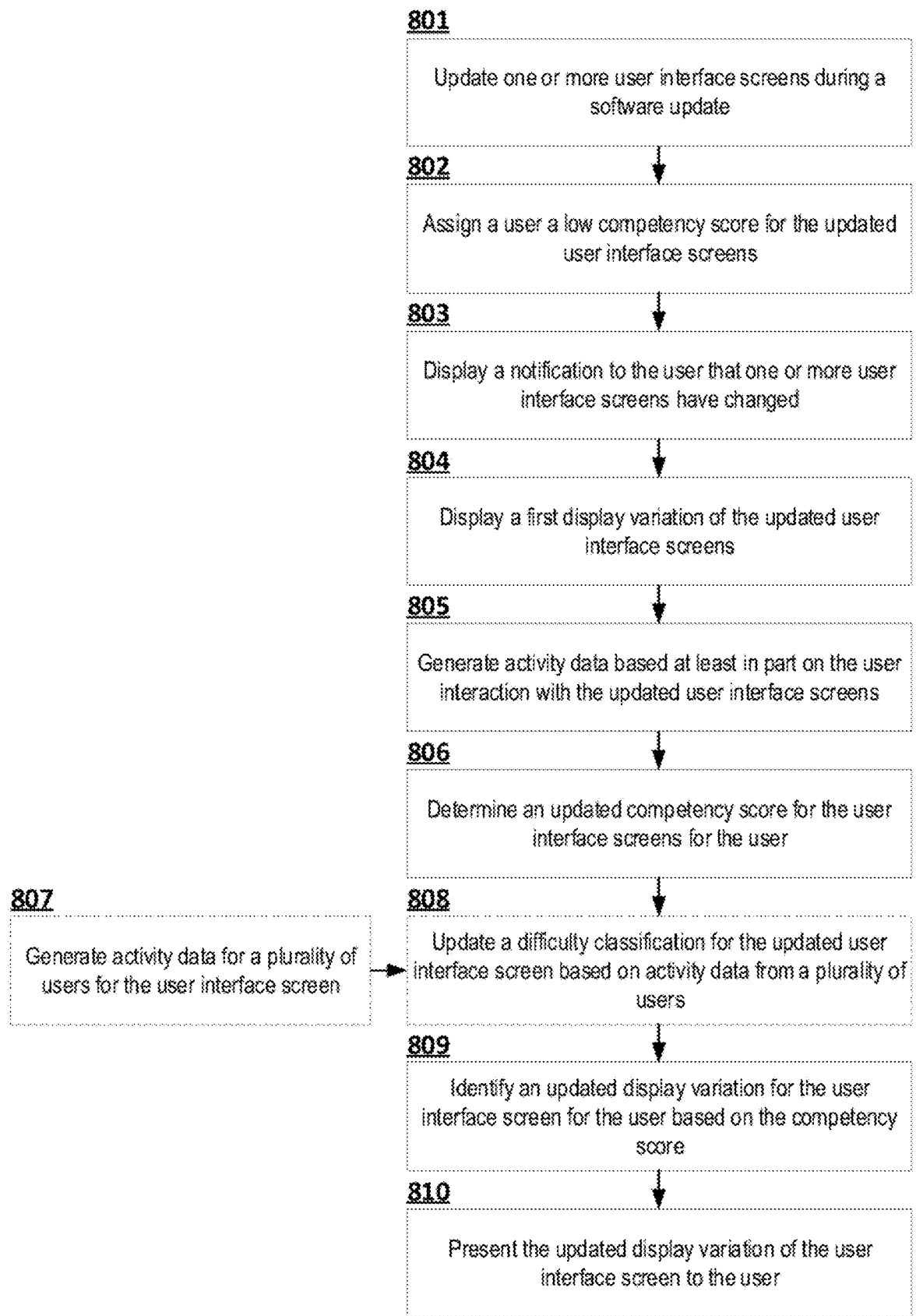
FIG. 8 is a flowchart illustrating an example process for training users to utilize new user interface screens via a machine-learning based selection of user interfaces, according to certain embodiments.

FIG. 8 provides a discussion of example processes for providing training to users when new user interface screens are added and/or the content of existing user interface screens are updated. It should be understood that similar processes may be utilized for new users and/or for users that are provided with access to new features of the cash handling device (and corresponding user interface screens).

Periodically, software of a cash handling device (or other specially-configured computing device or machinery) is updated, such as to reflect new functionality, to fix identified bugs, and/or for other reasons deemed necessary to update the software of the cash handling device. These periodic software updates may require changes to the set of user interface screens, such as reorganization of the user interface screens, changing of content on user interface screens, adding additional user interface screens to reflect new functionalities provided via the cash handling device, removal of certain user interface screens to reflect decreased functionalities provided via the cash handling device, and/or the like. These changes in the provided user interface screens may require that users are retrained in the usage of the cash handling device, so that users recognize the changes in the presented user interface screens and the users properly address the changed user interface screens during normal usage. While training may be provided in a separate training mode operation of the cash handling device (such that any input provided by a user does not impact the functionality of the cash handling device), the training may be provided during normal operation of the cash handling device, such that input provided by a user during training is utilized for operation of the cash handling device.

Figure 24:
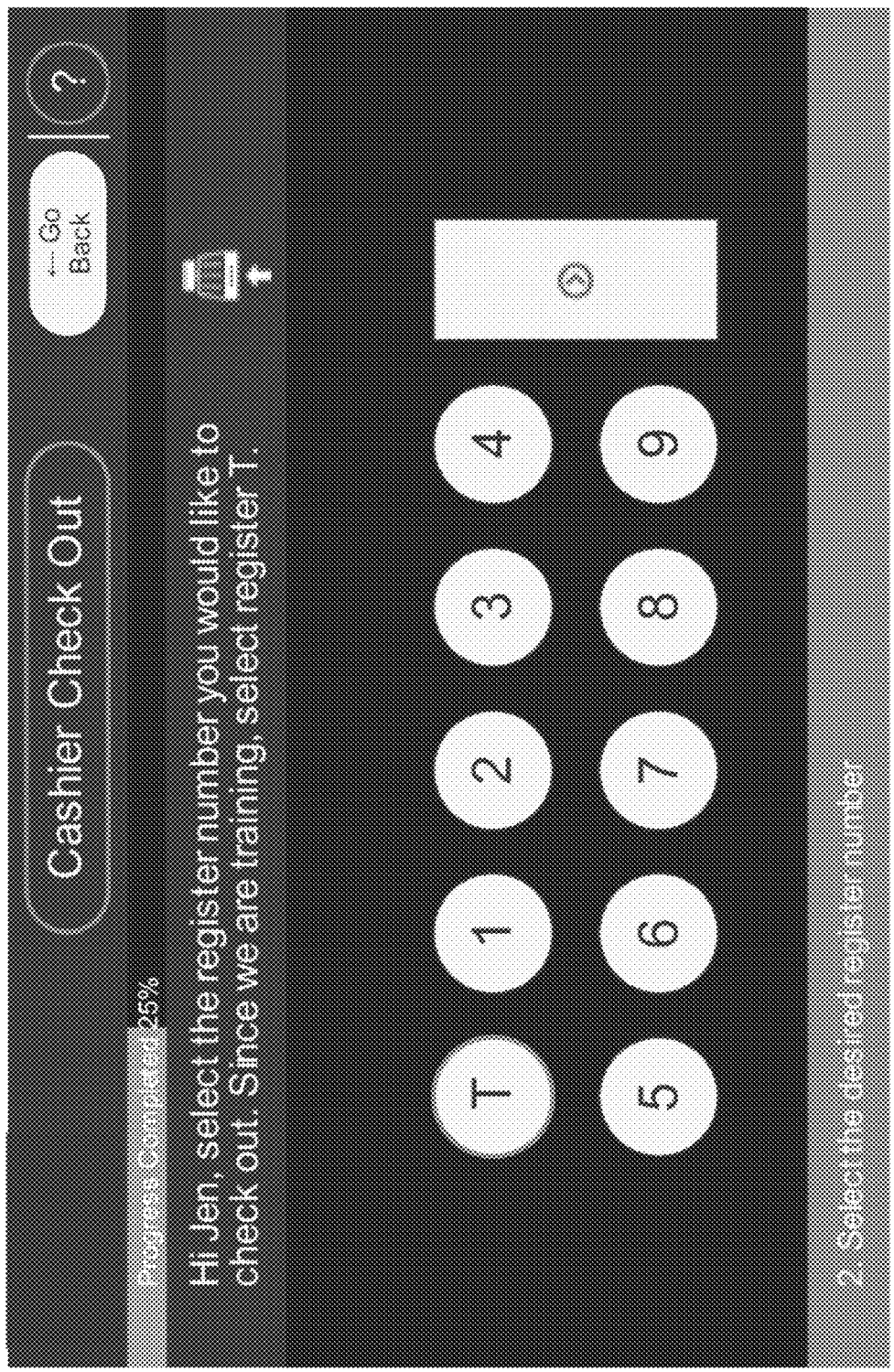

As an example, access to a separate training mode for certain functions may be provided within a normal workflow screen, such as by selecting a particular user interface element labeled "training" (e.g., selecting a "training" cash register to check in, as suggested in FIG. 24). Moreover, as indicated in FIG. 24, additional instructions may be provided to the user while in a training mode of operation, such as instructions specifically to select the "training" register within the user interface. Moreover, in certain embodiments the training configuration may additionally comprise one or more videos that are displayed to first-time users (or users having competency scores satisfying a particular criteria, such as being below a threshold), such as before a particular user interface screen is displayed. A training mode of the cash handling device may additionally provide a user with a recap of processes encountered during training at the close of the training process (e.g., immediately prior to logging the user out).

In certain embodiments, the cash handling device may be configured to provide a notification to users (e.g., via a displayed user interface) that training is being provided to the user in light of a recent software change. This notification may be provided to the user immediately before or after the user signs-in to the cash handling device, to provide the user with advance notice that certain user interfaces have changed and that additional training is being provided to the user to provide additional guidance on the new/updated user interfaces. In certain embodiments, the training may be implemented by providing users with display variations on those new/updated user interface screens that would typically be presented to low competency users. Moreover, to ensure that all users receive training, regardless of their frequency of using the cash handling device (e.g., such that users who may not use the cash handling device for an extended period of time after the update has been implemented), all users may receive a low competency classification for the newly added/updated user interface screens immediately following implementation of those newly added/updated user interface screens, until the user has navigated through those newly added/updated user interface screens one or more times (and the activity data generated by the user while on those user interface screens begins to reflect an increased competency with utilizing those user interface screens).

In other embodiments, a separate, training-specific user interface screen display variation may be provided to users when the user first navigates through the newly added/updated user interface screens, when a user gains access to additional user interface screens and workflows that were not previously presented to the user (and functionality of the cash handling device), and/or the like. In such embodiments, users need not be assigned a classification for interaction with the newly added/updated user interface screen until after the user first interacts with the newly added/updated user interface screen at least once. Thereafter, activity data generated by the user while interacting with the newly added/updated user interface screen may be utilized to classify the user based on the user's competency in utilizing the newly added/updated user interface screen.

With specific reference to the flowchart of FIG. 8, providing training for updated user interface screens begins with those user interface screens being updated, as reflected at Block 801. In certain embodiments, each of a plurality of display variations for a particular user interface screen may be updated, such that any user interface screen that may be provided to a user reflects the updated content. In certain embodiments, updating one or more user interface screens causes the system to automatically initialize a training procedure for the newly updated user interface screen, such that all users who interact with the user interface screen receive at least some level of training before those users begin receiving more advanced display variations (e.g., display variations having higher difficulty classifications).

As a part of the training procedure, each user is assigned a low competency score for the updated user interface screens, as reflected at Block 802. By assigning each user a low competency score for the particular user interface, each user receives a display variation providing a higher amount of training before the user begins accessing more streamlined display variations. To ensure a user is expecting changes in the user interfaces, the system displays a notification to the user via the display of the cash handling device (e.g., immediately after the user logs-in), reflecting that training is being provided for one or more user interfaces, as indicated at Block 803. When the user reaches a portion of a user interface set for which an updated user interface is provided, a first display variation (e.g., corresponding to a low competency score of a user) is displayed for the user to interact with the updated user interface, as indicated at Block 804.

As the user interacts with the first display variation of the updated user interface, activity data is generated by one or more activity trackers, as reflected at Block 805, and the machine-learning based model determines a competency score for the user, reflecting the user's interaction with the updated user interface, as indicated at Block 806.

The updated user interface screens (and display variations thereof) may be subject to periodic updates of difficulty classifications, in a manner analogous to that discussed above in reference to FIGS. 5-7. As shown at Blocks 807-808, activity data may be collected from a plurality of users interacting with the updated user interfaces, so as to determine updated difficulty classifications of the display variations of the updated user interfaces via machine-learning based models for assigning difficulty classifications. The difficulty classifications for specific display variations may be updated periodically (e.g., as additional activity data is generated by various users interacting with the user interfaces), and the updated difficulty classifications may be utilized for assigning a particular display variation to a user, as indicated at Block 809. The updated display variation is then presented to the user operating the cash handling device, as indicated at Block 810.

Example User Interfaces

The user interface screens illustrated in FIGS. 9-24 are provided to facilitate a process for completing accounting processes associated with a retail establishment, including checking in register tills, ensuring proper quantities of cash are placed within register tills at the start of an accounting day/shift, performing accounting activities associated with a register till pickup (e.g., to remove cash from the register till and to place that cash into a safe or other location). The cash handling device (e.g., together with the monitoring server) is configured to automatically customize one or more of the user interface screens for individual users, based at least in part on determined user capabilities in performing tasks associated with those user interface screens as well as execution of a machine-learning based model for determining most-appropriate customization features, strategies, layouts, and/or the like for the user's ability.

As mentioned, the user interface screens are provided as just one set of examples. The cash handling device is configured to generate and/or select user interface screens based on a user's assigned tasks/access, based on previous activities (e.g., by other users), based on the cash handling device's contents, and/or the like. For example, if a user's role is to checkout/check-in a particular register till, the cash handling device only displays tasks associated with checking out or checking in the particular register till to the user, and only if another user has not previously completed the necessary checkout or check-in task for that register. In certain embodiments, a user's role/responsibility may vary (e.g., across different days), and therefore the content of user interfaces may vary for a single user as the user's role/responsibility varies. As another scenario, if a particular denomination of cash is unavailable for dispensing from the cash handling device, the cash handling device may present an alternative user interface screen to the user requesting that the user select from one or more alternative cash denominations for dispensing in place of the unavailable cash denomination.

As yet another example of alternative user interfaces that may be presented to a user based at least in part on previous activities with the cash handling device, the cash handling device may be configured to present an alternative user interface to a user when an error has occurred that cannot be remedied by the user (e.g., based on the user's access credentials). As an example, a cash jam within the cash handling device may not be remedied by certain users (e.g., because freeing the jammed cash may require a user to physically open the cash handling device), and so the cash handling device may present an error screen to a user indicating that the user will require additional assistance from another user with different access credentials. In such embodiments, the cash handling device may be configured to present a user interface identifying the error to other users (e.g., users with appropriate access credentials to remedy the error), when those other users log into the cash handling device.

Moreover, the user interface screens to be displayed on a particular cash handling device and/or to be displayed to a particular user (or group of users) may include display features that are specific to a particular retailer. While the monitoring server may be operated by an external service provider, the user interface screens may have brand logos, layouts, color schemes, and/or the like that are specific to a particular retailer. For monitoring server embodiments providing analogous functionality to a plurality of cash handling devices and/or for a plurality of retailers, the monitoring server is configured to implement retailer preferences/requirements in generating user interface screens having appropriate retailer-specific features and/or other indications thereon.

A plurality of user interfaces may be displayed in series during completion of a particular process/workflow at the cash handling device. Each consecutively displayed user interface screen is displayed in response to a request generated at the cash handling device. The request may comprise or may be embodied as user input received at the cash handling device of a prior user interface, wherein the user input is provided to complete the tasks of the previous user interface. Thus, as the user provides user input on a previous user interface screen, the cash handling device requests the consecutively next user interface screen to be displayed to the user. As discussed herein, the system selects and/or retrieves the appropriate display variation for the user interface screen in response to the generated request for the user interface screen.

In certain embodiments, the monitoring server may be configured to perform one or more automated processes for manipulating the operation of the cash handling device, such as to determine a daily quantity of cash (at the denominational level) for providing into various register tills. Such a determination may be reflected at the cash handling device based at least in part on the quantity of cash dispensed from the cash handling device, as well as by data included within a user interface generated and displayed at the cash handling device (e.g., one or more graphical user interfaces reflected within FIGS. 9-24).

Moreover, as reflected within the example graphical user interfaces of FIGS. 9-24, certain embodiments are configured for implementing one or more processes for ensuring that users of the cash handling device are properly performing all steps (e.g., physical interactions with the cash handling device and electronic accounting-based interactions with various user computing entities impacting data stored at the monitoring server and associated with the cash handling device). As shown in certain of the example user interfaces of FIGS. 9-24, the monitoring server (or cash handling device) may be configured to detect when an incorrect or out-of-order action occurs, and to provide the user with an appropriate user interface providing additional instruction regarding the appropriate order-of-operations and/or the appropriate steps for performing various tasks.

Moreover, embodiments as reflected with the illustrated displays of FIGS. 9-24 are additionally configured to determine when, during a particular workflow, the user is required to step away from the cash handling device to perform steps necessary in the execution of the workflow, such that the system is configured to provide detailed instructions to the user of steps necessary for completion of the described processes, and to automatically log the user out with the cash handling device. Such automated log-out ensures that other unauthorized users are prevented from accessing secure data within the cash handling device that may be accessible via a particular user's access credentials. Moreover, the user's progress in completing a particular workflow may be stored in association with the user's unique access identification credentials, such that multiple users may be performing multiple corresponding workflows at least substantially simultaneously, with each user's current progress in completing their respective workflows being associated with their respective access credentials. Thus, as one user logs-out of access to the cash handling device, and another user logs-in to access the cash handling device, the second user's current progress in completing an assigned workflow process may be unaffected by the first user's previous usage of the cash handling device.

FIG. 9 specifically illustrates an example user interface screen to be displayed prior to a user logging-in to utilize the cash handling device. Because this screen is displayed prior to log-in, the screen of FIG. 9 need not have multiple display variations thereof.

FIG. 10 is an example of a first screen to be displayed to a user after log-in. As noted above, the example screen set shown in FIGS. 9-24 are provided for an example morning routine, and therefore it should be understood that other screens, with other content may be provided to users at other times of day, and therefore it should be understood that the screens to be displayed to a user may be time-dependent. Display variations of a user interface such as that shown in FIG. 10 may include a display variation in which this user interface is not displayed to the user (e.g., for users determined to be advanced users). Other display variations may include audio-visual animations providing emphasis on each of the two available selectable interactive elements (the "YES" and "NO" buttons), where the emphasis is provided in sequence, and the emphasis is provided together with an explanation of the function of each button, such that users may understand how the cash handling device will react upon the user selecting each button. This latter example display variation may be presented to new users or to users with a determined lower level of competency in operating the user interface of FIG. 10.

Figure 11:
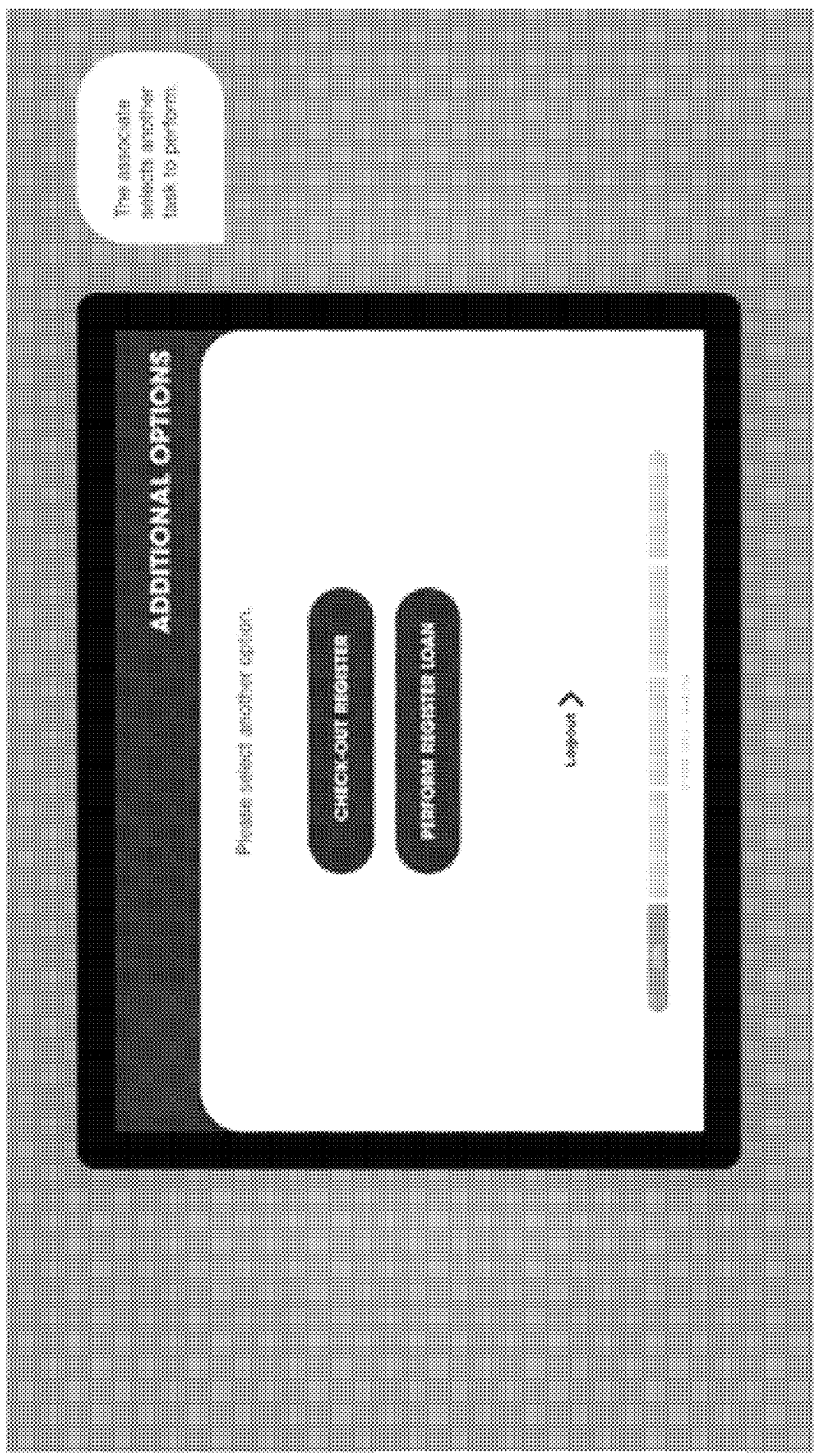

FIG. 11 illustrates an example user interface screen that may be presented to a user if the user indicates that the user is not ready to perform a daily morning routine (a selection made at FIG. 10), and FIG. 11 presents other options that may be performed by the user. A display variation of FIG. 11 may include an audio-visual animation providing emphasis on each of the available selectable interactive elements, where the emphasis is provided in sequence, and the emphasis is provided together with an explanation of the function of each button, such that users may understand how the cash handling device will react upon the user selecting each button. Such a display variation may be provided to new users or to users with a determined lower level of competency in operating the user interface of FIG. 11.

Figure 12:
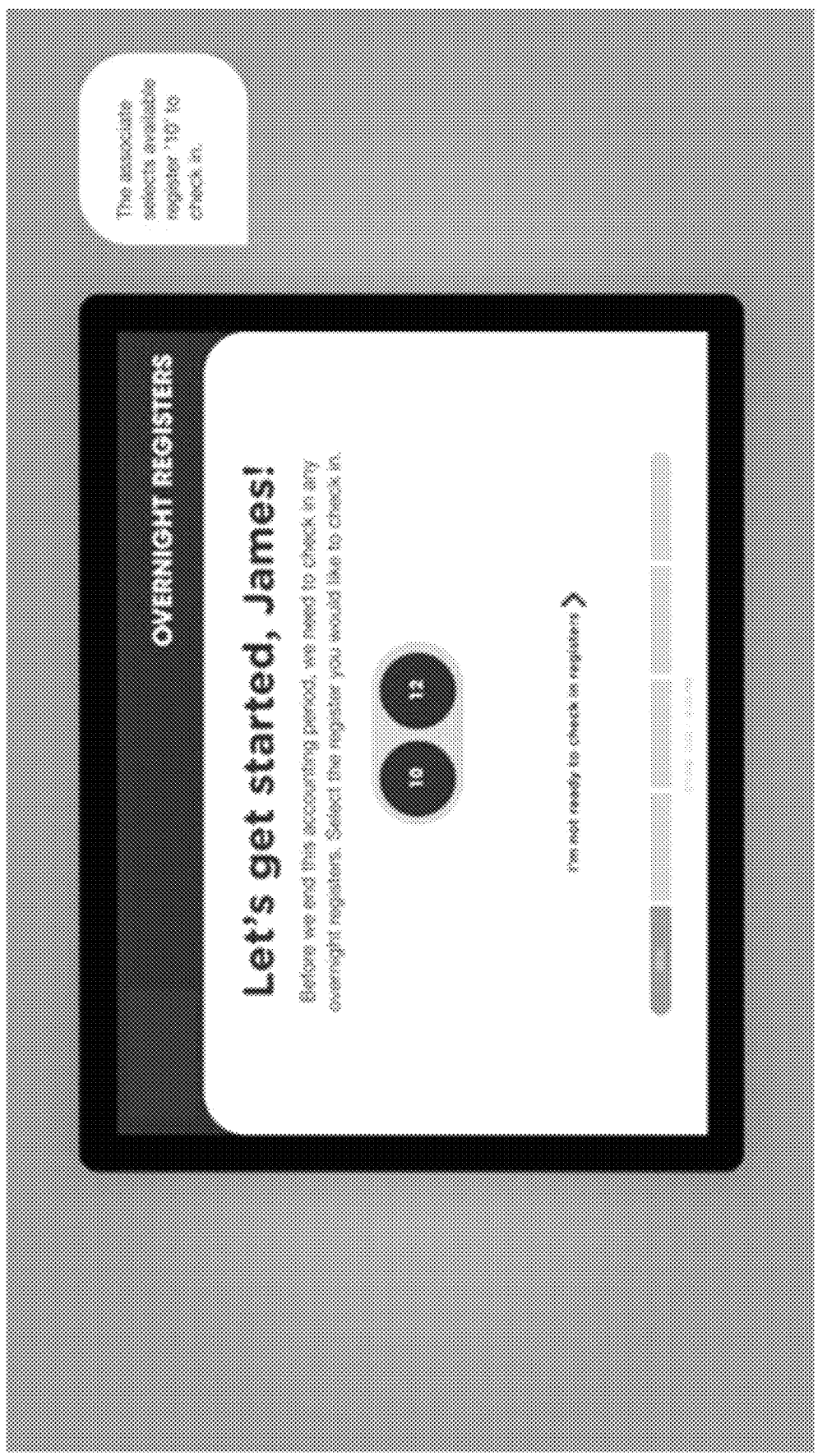

FIG. 12 provides a first user interface screen that may be provided to a user when beginning a morning routine. The example screen of FIG. 12 may be selected for display based at least in part on a determination that data generated by the store that is indicative of the store's operation (and therefore indicative of tasks that need to be completed to ensure smooth operation of the store). It should be understood that other user interface screens may be displayed based on a determination that other operations within the store occurred, which dictate a different set of tasks to be performed by a user at the cash handling device.

The user may be presented with interactive features for selecting registers to be checked-in to the cash handling device. Display variations of FIG. 12 may encompass a more detailed display, with the user capable of entering data for each of multiple registers within the same user interface. Such a display variation may be provided to users indicated as highly proficient in entering data via the user interface of FIG. 12. Another display variation that may be presented to new users and/or users having low competency scores may present additional explanation, and/or may split the user interface of FIG. 12 into multiple user interface screens, with each user interface screen requesting input for a specific register till, such that users are less likely to mix up data between multiple register tills (e.g., providing data relevant to register till 12 when entering data into user interface elements corresponding to register till 10).

Figure 13:
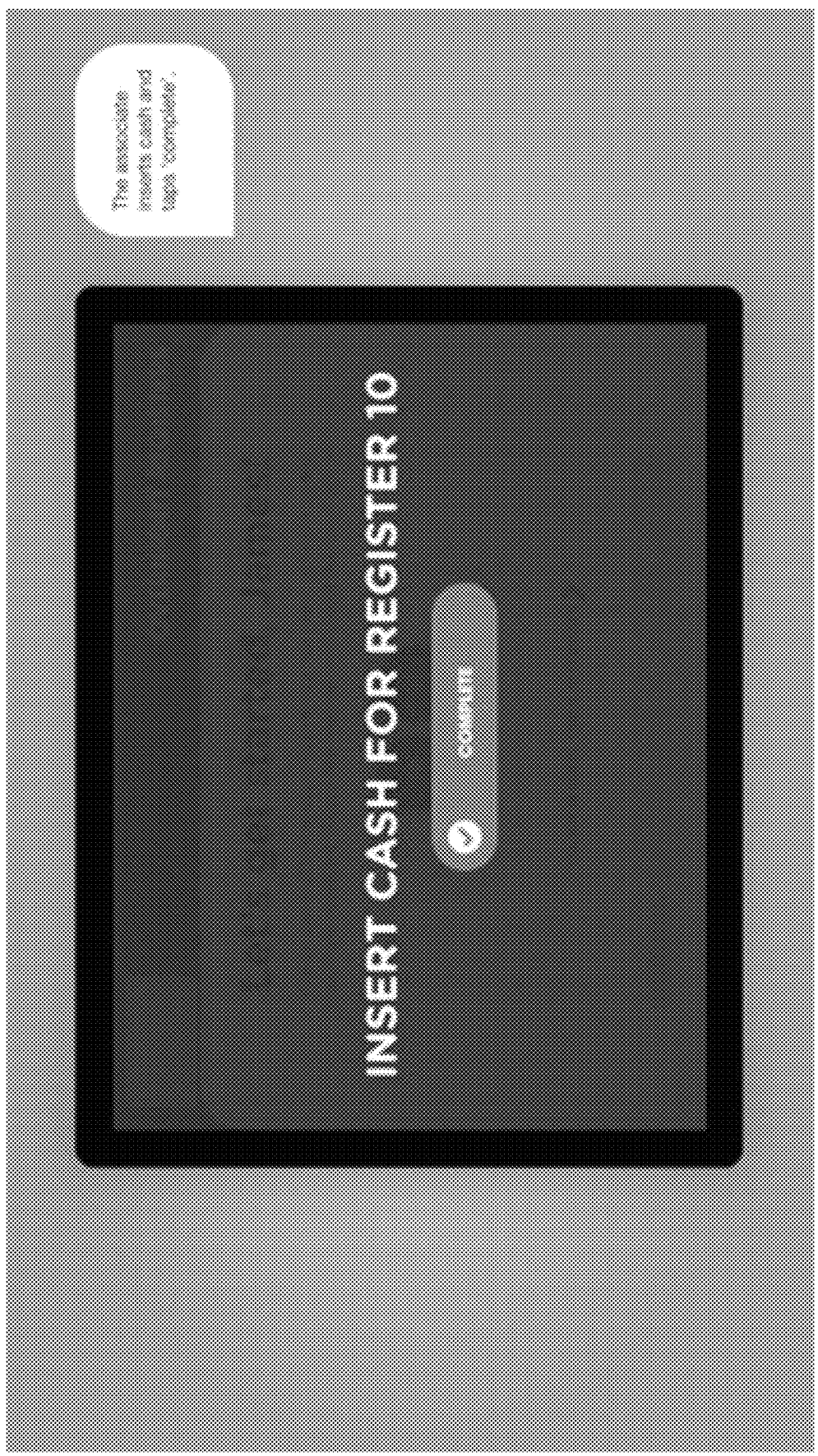

FIG. 13 provides an example user interface that may be presented to a user after selecting (at FIG. 12) to check-in Register 10 (user input selecting to check-in Register 10 generates a request for the user interface screen of FIG. 13). The user interface of FIG. 13 may be presented simultaneously with opening a cash acceptance slot to be utilized for accepting cash presented to the cash handling device. An example display variation for the user interface of FIG. 13 may include a visual diagram showing the user where on a register till to check to ensure that cash from the proper register till is being added to the cash handling device (if applicable). Such a display variation may be provided to new users and/or users determined to have a low competency score for completing the task relevant to the user interface of FIG. 13.

Figure 14:
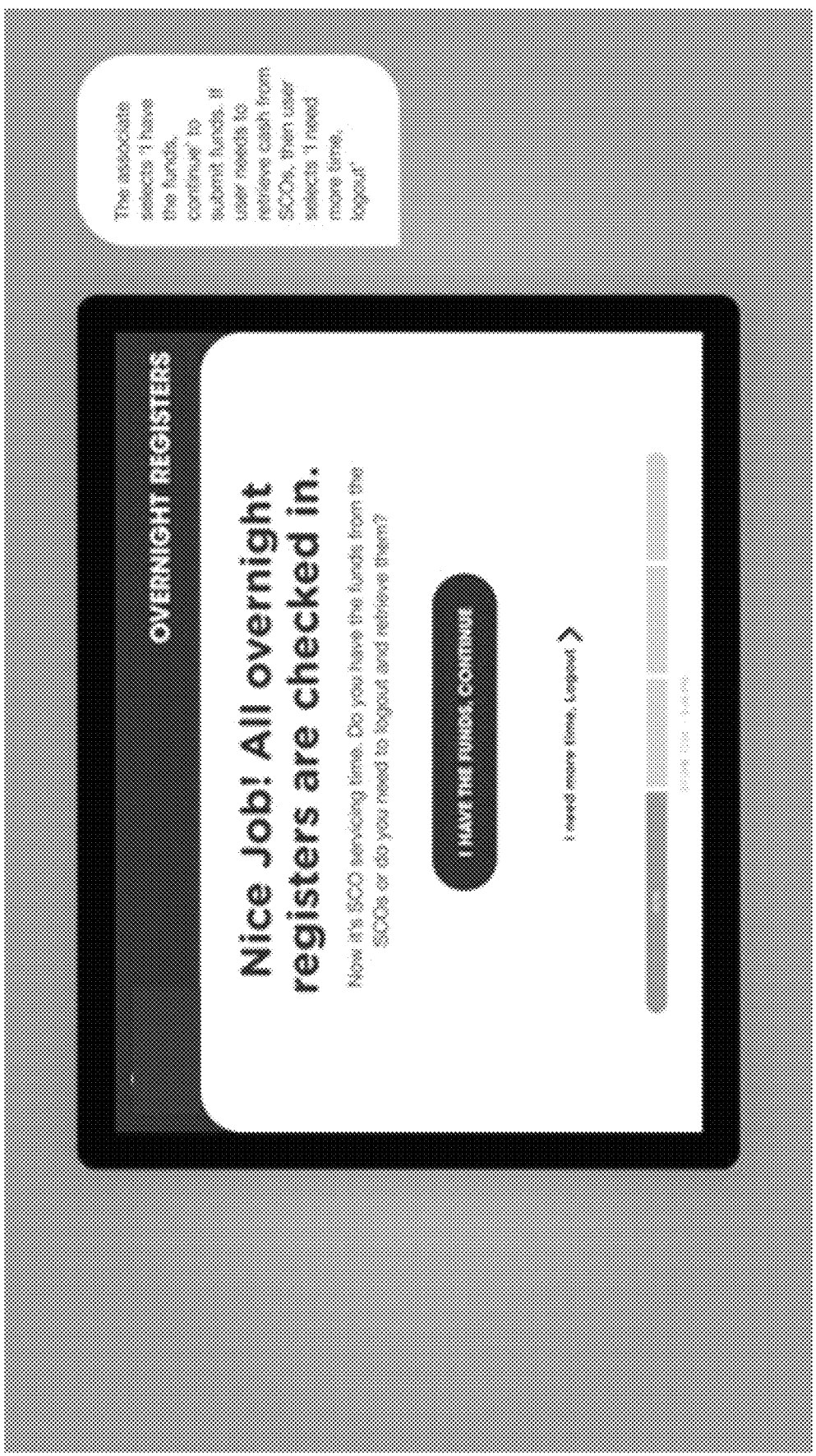

FIG. 14 provides an example screen that may be presented to a user after checking-in all registers tills, and indicating that additional steps are needed for servicing self-checkout registers. FIG. 14 specifically provides initial instructions regarding the funds needed for advancing beyond the next user interface screens. FIG. 14 additionally suggests that the user logout of the cash handling device if the user does not have the necessary funds to continue. As an example display variation, a user interface to be displayed to new users and/or users having a low competency score for the user interface of FIG. 14 may provide additional textual instructions regarding the needed funds/materials to complete the steps that follow.

Figure 15:
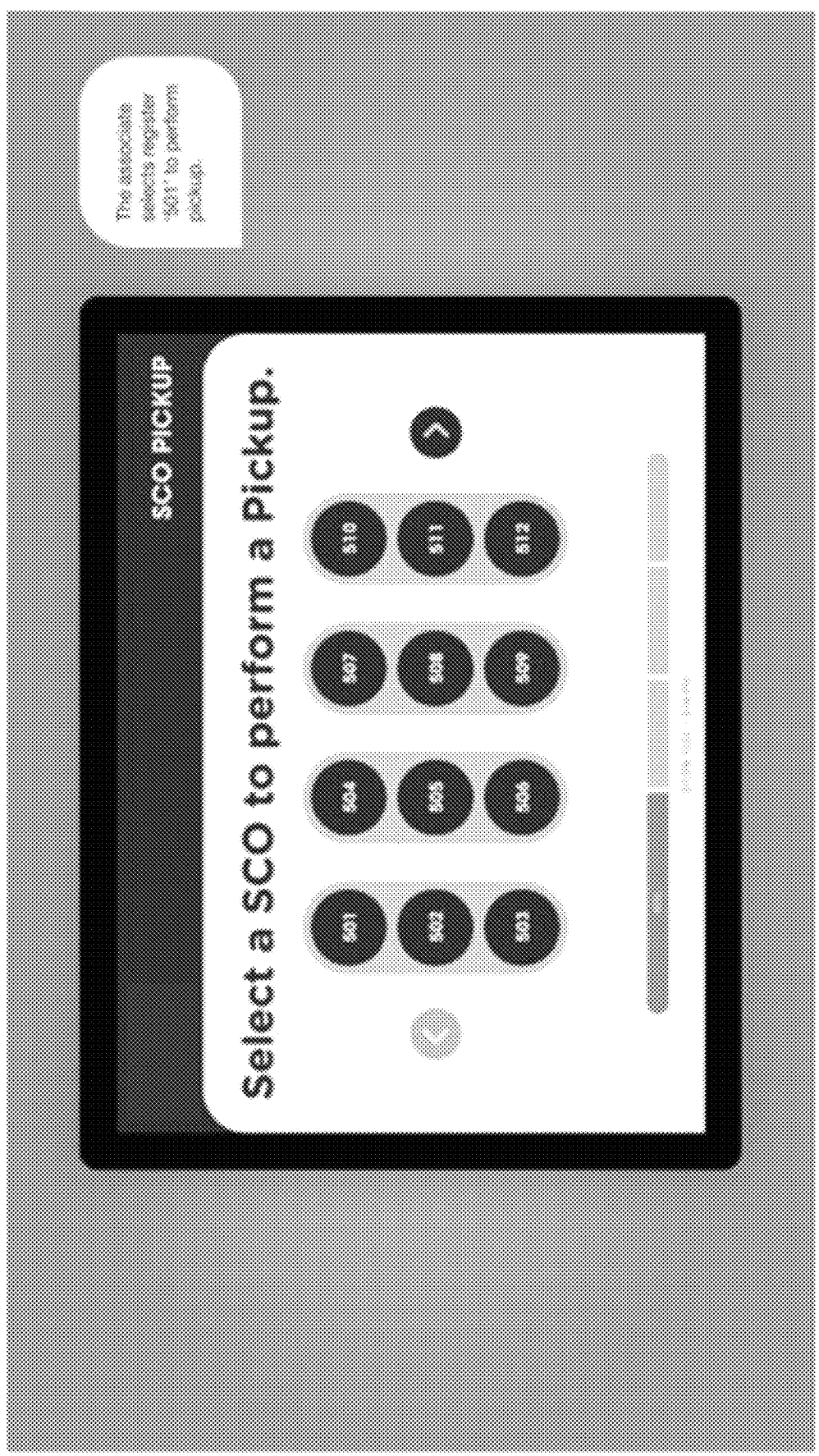

FIG. 15 provides an example screen that may be presented to a user to check-in self-checkout register tills, by presenting the user with an interactive user interface enabling the user to select individual tills to be serviced. As an example display variation, the user interface of FIG. 15 may be divided into multiple user interfaces for new users and/or for users having low competency scores for completing the tasks associated with the user interface of FIG. 15, such that only a subset of self-checkout register tills are illustrated to the user, thereby minimizing the number of selectable user interface elements available to the user (and thereby minimizing the likelihood that the user selects an incorrect user interface element when entering data for self-checkout register tills).

Figure 16:
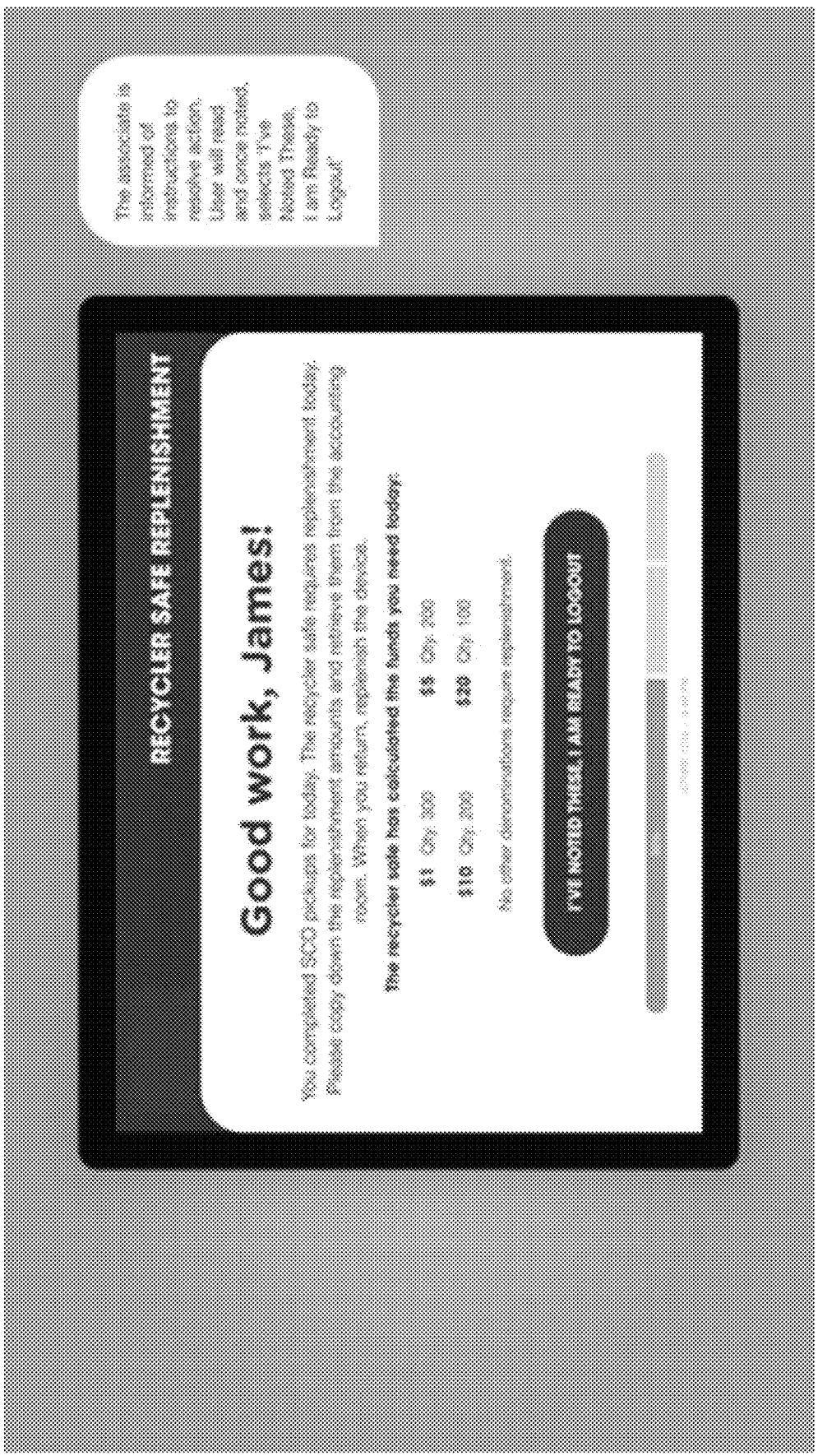

FIG. 16 provides an example screen that may be presented to a user after completion of servicing all self-checkout registers that require servicing. Specifically, FIG. 16 provides instructions for replenishing an amount of cash within a recycler of the cash handling device, including specific instructions for where a user should retrieve cash, the amounts of cash to be retrieved for addition to the cash handling device recycler, and an interactive user interface element that logs the user out of the cash handing device while the user leaves to retrieve the instructed amount of cash. As a part of generating and displaying the content of the example user interface screen of FIG. 16, the cash handling device (and/or the monitoring server) is configured to determine the minimum amount of cash that should be stored within the cash handling device recycler (e.g., at a denominational level), to determine the amount of cash currently stored within the cash handling device recycler (e.g., at a denomination level), and to calculate the amount of cash that should be added to the cash handling recycler such that the amount of cash within the cash handling device satisfies the determined minimum amount of cash to be stored within the cash handling device recycler.

Figure 17A:
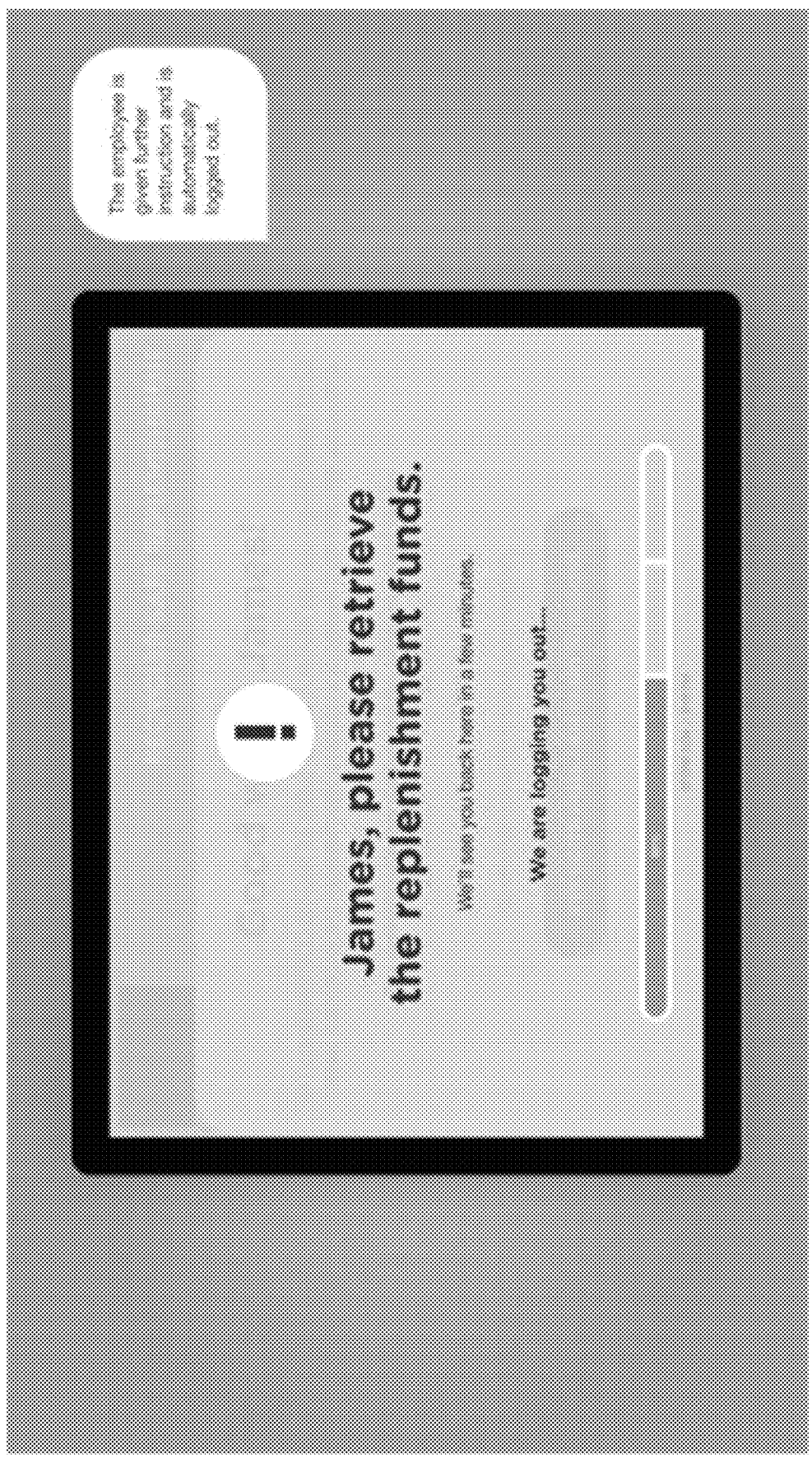

FIG. 17A is an example user interface that may be presented to a user after the user indicates that he/she is ready to retrieve the indicated fund quantities for providing to the cash handling device recycler. No interactive features are present in the display of FIG. 17A, however the user interface may be displayed for a limited period of time (e.g., 5 seconds) prior to the cash handling device logging the user out (and returning to the display of FIG. 9). The cash handling device controller (and/or the monitoring server) may store an indication of the last-completed screen by the user, such that once the user logs-in again to the cash handling device, a screen requesting the user to provide the additional funds for replenishing the cash handling device controller is displayed, without the user being required to work through the previously displayed (and already completed) user interface screens).

Figure 17B:
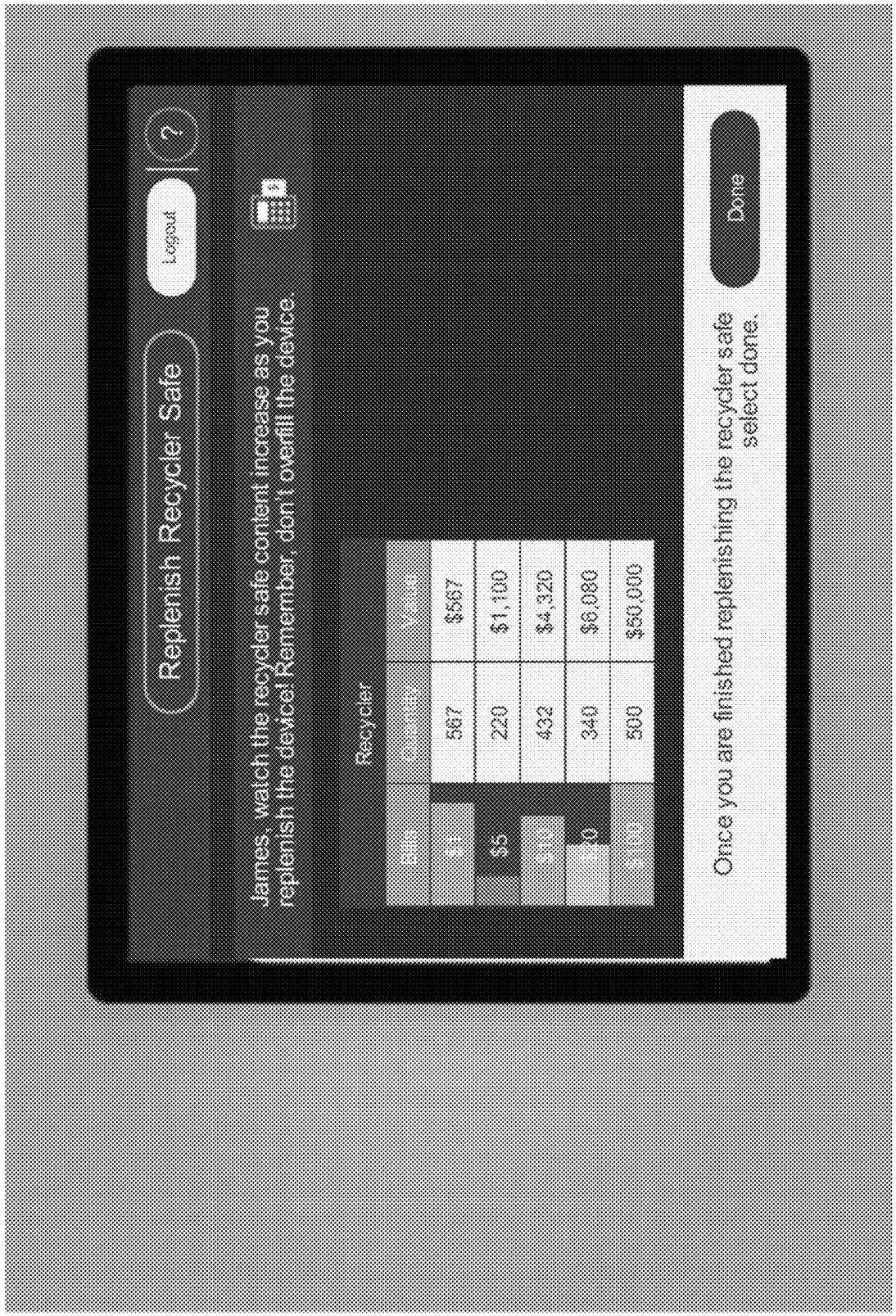

FIG. 17B provides an example user interface that may be presented to a user while the user is providing funds to the cash handling device recycler. As shown, the user interface may comprise an interactive element illustrating the amount of funds within the cash handling device recycler safe, by denomination, as the user provides funds to the cash handling device.

Figure 18:

Once the user has replenished the funds in the cash handling device recycler, the user interface of FIG. 18 may be presented to the user, indicating that the user has completed the recycler replenishment tasks and indicating that the drop vault should be emptied from the cash handling device. As a part of generating the display of FIG. 18, the cash handling device monitors the amount of cash within the included vault of the cash handling device, such that the cash handling device controller is capable of determining when the onboard vault is sufficiently full as to warrant emptying the vault during the user's processing routine. Upon determining that the vault warrants emptying, the cash handling device controller provides an indication to the user through a user interface of FIG. 18 (and FIG. 19, as indicated below) providing instructions to empty the cash handling device vault.

Figure 19:
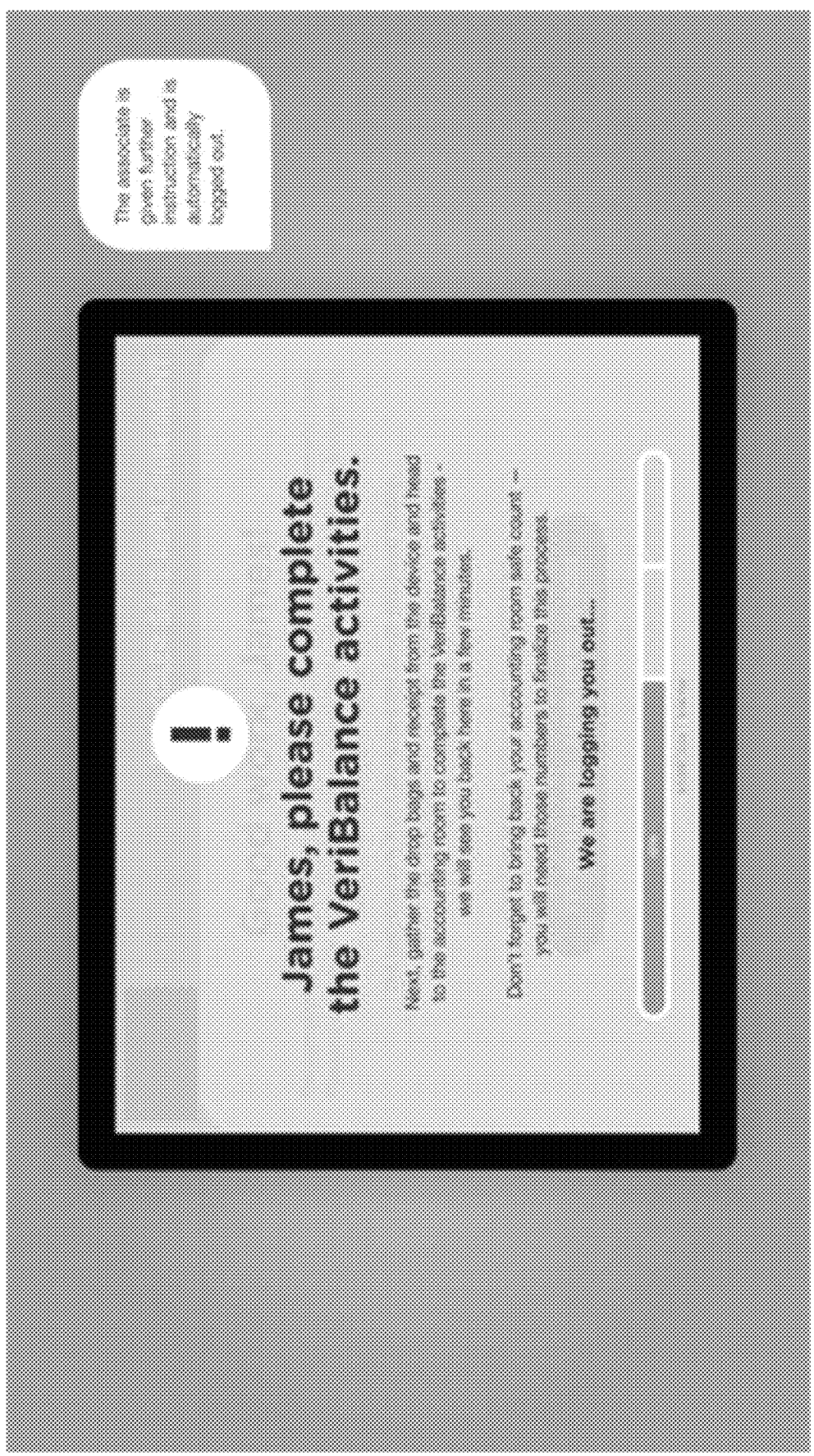

FIG. 19 is an example user interface that may be displayed to a user providing additional instructions for emptying the cash handling device vault. Like FIG. 17A, the display of FIG. 19 may not include any interactive user interface elements, but may instead be displayed for a set period of time (e.g., 5 seconds) before the user is logged out and the display returns to the display of FIG. 9. The cash handling device controller (and/or the monitoring server) may store an indication of the last-completed screen by the user, such that once the user logs-in again to the cash handling device, the user need not work through all of the previously completed user interfaces. As an example display variation, the user interface of FIG. 19 may provide a user-selectable element requesting confirmation that the user understands the steps to be taken by the user after the user logs out of the cash handling device. Such a display variation may be provided to new users and/or users having a low competency score for completing tasks associated with the user interface of FIG. 19.

Figure 20:
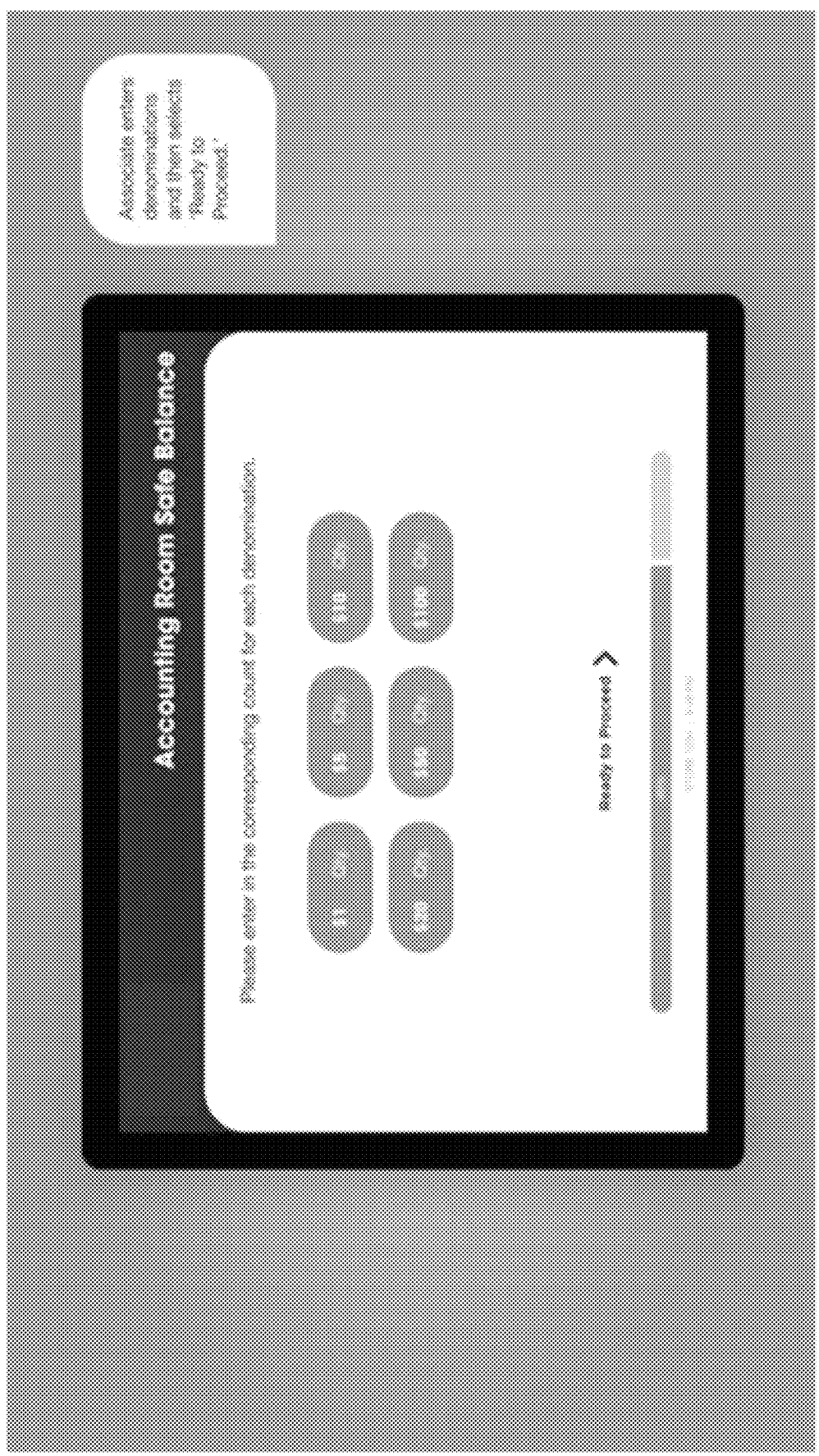

FIG. 20 is an example user interface that may be displayed to a user for the user to provide an indication of the amount of cash stored within a non-network connected safe of the retailer. In the specific example of FIG. 20, this safe is indicated as the "Accounting Room Safe," however it should be understood that the external safe may be referred to by other terminology, as appropriate for the understanding of users of the cash handling device. The user interface of FIG. 20 includes interactive features enabling the user to select individual denominations to provide a count of cash of each denomination that is stored within the safe. By providing this information to the cash handling device, the cash handling device may provide this information to the monitoring server, which can then provide an accurate count of cash currently stored at the retail location, which may be utilized to influence when cash should be ordered/picked-up for a bank. As an example display variation, the user interface of FIG. 20 may provide additional text-based descriptions of the required information, and/or the user interface may require the user to enter the quantities of cash for each denomination in order (e.g., the total number of $1 bills must be entered before the total number of $5 bills can be entered, and so on until the $100 bill quantity is entered). Such a display variation may be provided to new users and/or users with a low competency score for completing the tasks requested via the user interface of FIG. 20.

Figure 21:
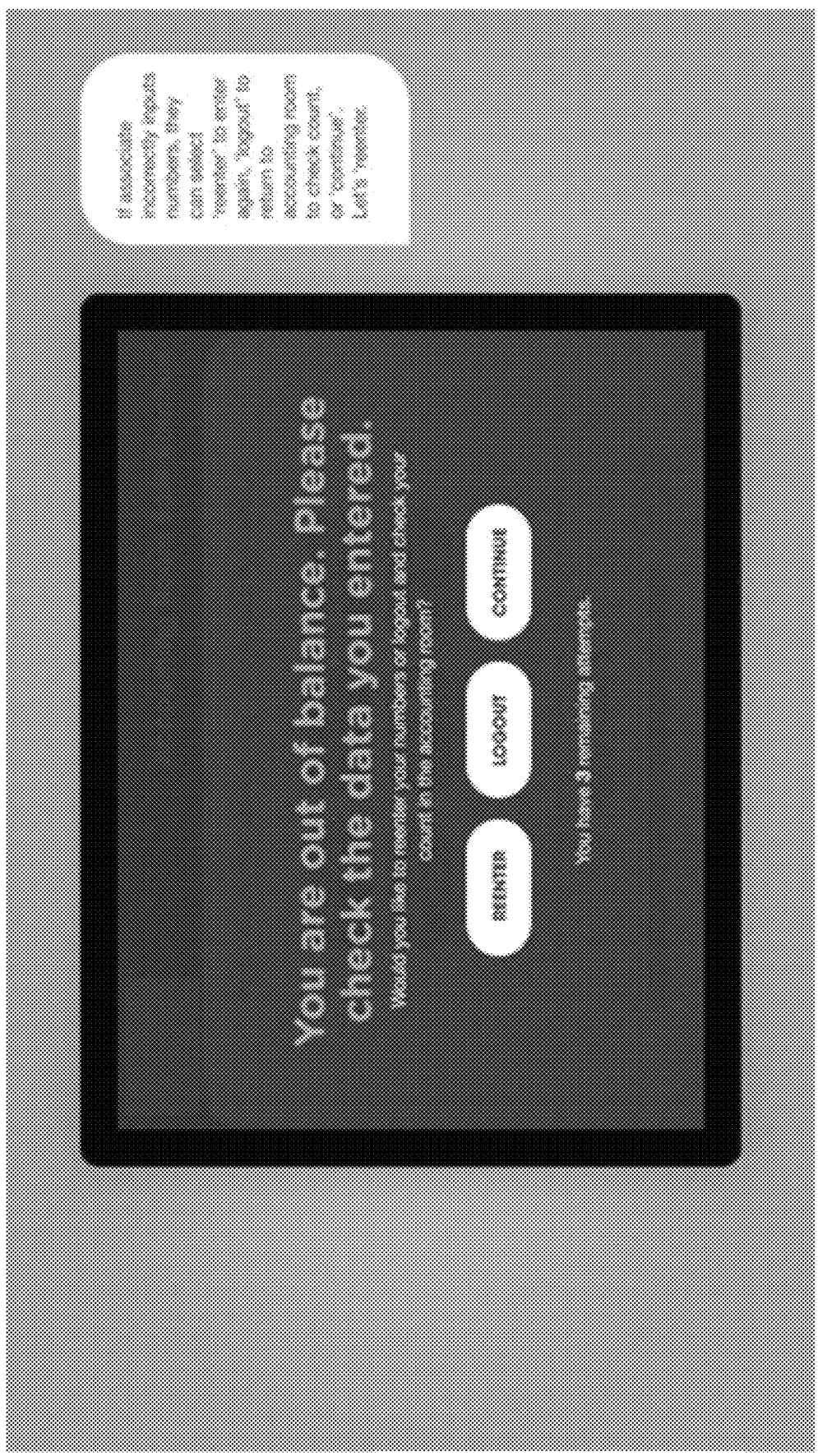

FIG. 21 provides additional instructions to the user if the user enters quantities of cash within the safe that do not balance with expected amounts of cash within the external safe. The instructions are provided with interactive elements suggesting that the user reenter the counts for one or more denominations, that the user logout to recount the amount of cash within the external safe, or to continue, thereby accepting the out-of-balance amounts. As a part of generating the display of FIG. 21, the cash handling device and/or the monitoring server calculate an expected amount of cash within the external safe, based at least in part on data received from one or more cash registers indicating the amount of cash stored therein and the amount of cash provided from the cash registers to the cash handling device, the amount of cash that was previously stored within the external safe, the amount of cash delivered to the external safe, the amount of cash stored within the recycler and the vault of the cash handling device, and/or the like. Thus, the cash handling device controller is configured to compare an expected amount of cash within the external safe against an amount entered by the user (e.g., via the interactive display of FIG. 20), so that the cash handling device is capable of informing the user of potentially erroneous entries of cash quantities within the external vault via a display such as that shown in FIG. 21. As an example display variation of the user interface of FIG. 21, the user interface may provide an additional interactive element that links to a more detailed set of training/instructions for how to complete a count for a particular denomination of funds. This additional interactive element may only be displayed for new users and/or users determined to have a low competency score for completing a count of bills within an external safe.

Figure 22:
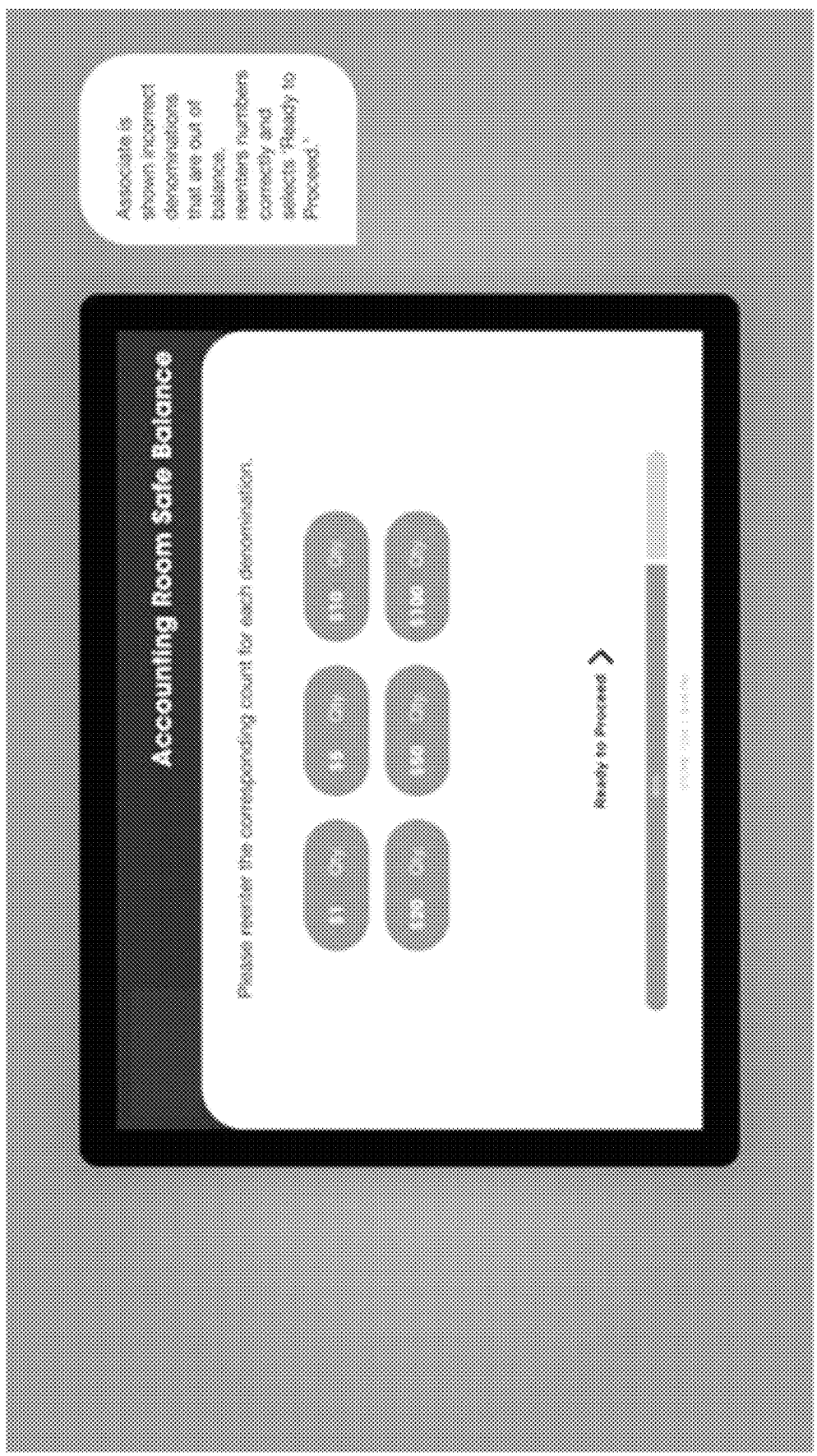

FIG. 22 provides a display similar to that of FIG. 20, except the denominations of cash determined to be out-of-balance are emphasized with a color different from those cash denominations for which the entered amount of cash was determined to be in-balance. The display of FIG. 22 is provided to the user after the user requests to reenter the amounts of cash within the external safe via the corresponding user interface element of FIG. 21.

Figure 23:
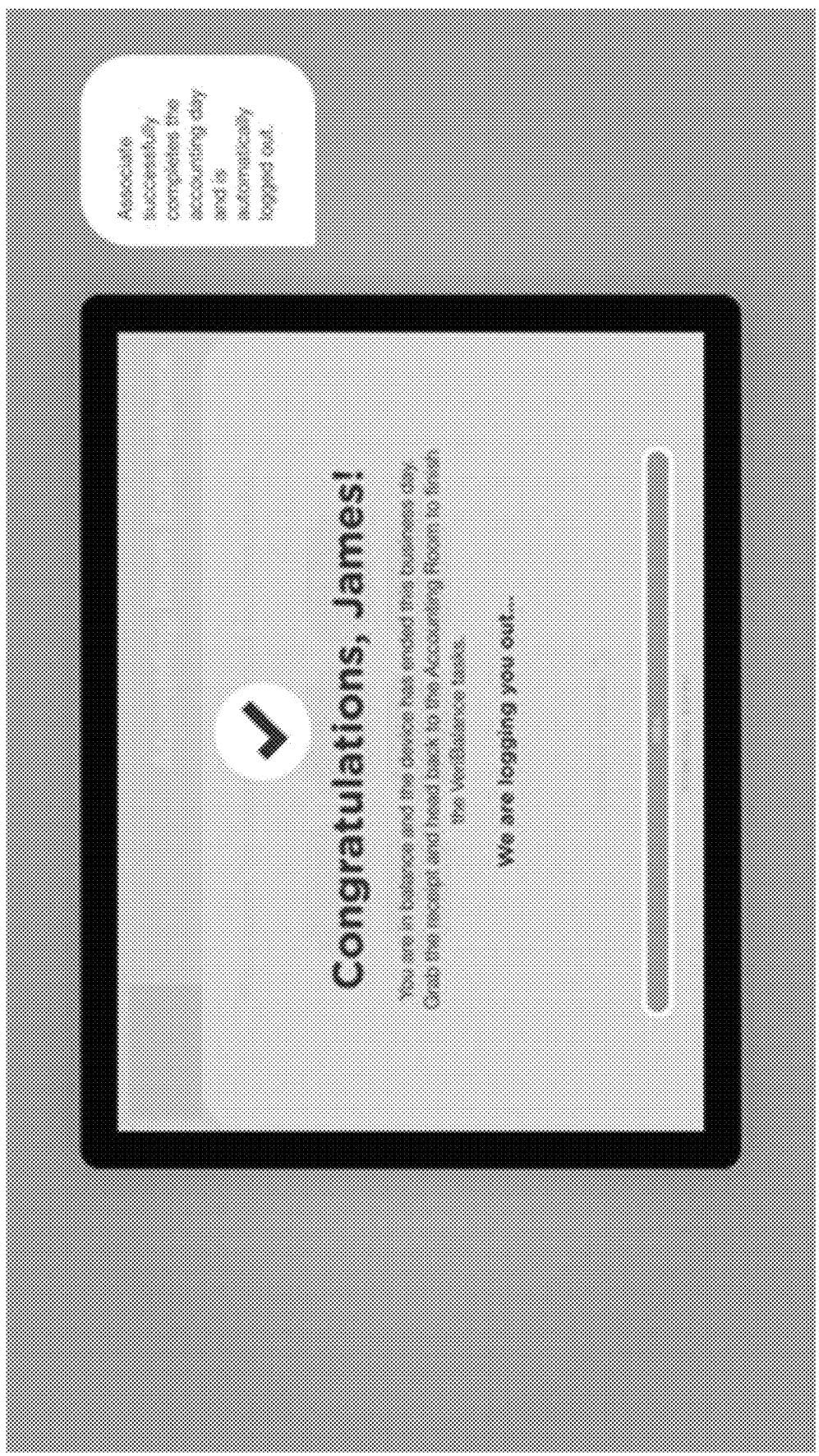

FIG. 23 is an example final user interface that may be presented to a user upon the user completing the entirety of the user's morning routine. Since the user has completed all of the required tasks of the routine, the user interface of FIG. 23 does not include any interactive elements, and may be displayed for a period of time (e.g., 5 seconds) before the cash handling device automatically logs the user out and returns to the user interface of FIG. 9.

As emphasized previously, the user interfaces of FIGS. 9-24 are provided merely as examples, and other user interfaces, process flows, display variations, and/or other configurations may be provided in accordance with certain embodiments.

Additional Example Display Variations

As discussed herein, display variations may be provided for one or more user interface screens to accommodate the determined capabilities of users. Those display variations may provide additional guidance to users who struggle with one or more user interface screens, or those display variations may streamline the information provided via one or more user interface screens for users that are highly proficient, so as to increase the rate at which those users can work through the user interface screens.

Display variations to provide additional guidance to users may encompass display variations of user interface screens including enlarged font, including additional explanatory content, including delayed-display of content (e.g., to effectively force users to read the displayed content before enabling the user to click a button to continue), providing highlighting/emphasis of certain displayed content together with feature-specific explanations of the functionality of those features, splitting the content of a user interface screen across multiple user interface screens, and/or the like.

Yet other example display variations include periodically changing the layout/format of a particular user interface screen (to force a user to slow down and read the content of a user interface screen before clicking a button to continue), such as by moving the location of buttons on the user interface screen.

Display variations provided to facilitate efficient usage of user interface screens for highly proficient users may comprise enlarging certain buttons to continue, minimizing the amount of instructional content on the user interface screen, or eliminating the user interface screen entirely. For the latter concept, the system may be configured to provide an indication that a particular user received a blank display variation or a display variation requiring no user interaction to proceed, such that any activity data generated by the user on temporally adjacent user interface screens may be correlated with the blank (or non-displayed) user interface screens to provide an indication as to whether the omission of the user interface screen increased or decreased efficiency of the user.

CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A system for managing user interface screens to be presented via a cash handling device, the system comprising:
   one or more memory storage areas; and
   one or more processors collectively configured to:

receive a user identifier for a user provided to the cash handling device to enable use of the cash handling device by the user;

cause a display device of the cash handling device to display an initial display variation of one or more user interfaces, wherein the initial display variation of the one or more user interfaces is displayed based at least in part on an initial competency level for the user identifier;

receive activity data for the user interacting with the initial display variation of the one or more user interfaces during use of the cash handling device, wherein the activity data is stored in association with the user identifier of the user and the activity data comprises at least one of:

data tracking key presses by the user interacting with the one or more user interfaces before the user presses a proper key on the one or more user interfaces;

data tracking movement of a cursor by the user on the one or more user interfaces; or data characterizing an interaction provided via a touch-screen device of the cash handling device displaying the one or more user interfaces;

determine a competency score for the user based at least in part on the activity data;

execute a machine-learning based model for selecting an applicable display variation for at least one user interface of the one or more user interfaces based at least in part on the competency score, wherein the applicable display variation is selected from a plurality of display variations for the at least one user interface;

receive a request to display the at least one user interface of the one or more user interfaces, wherein the request comprises the user identifier of the user; and cause the display device of the cash handling device to display the applicable display variation of the at least one user interface of the one or more user interfaces.

2. The system of claim 1, wherein the machine-learning based model is trained, at least in part, by:

receiving training data for a plurality of users, wherein the training data comprises activity data for each of the plurality of users;

classifying each of the plurality of users into one of a plurality of competency levels; and assigning a display variation of the plurality of display variations to each of the plurality of competency levels.

3. The system of claim 2, wherein the training data comprises activity data corresponding to each of the plurality of users that is indicative of the plurality of users' interactions with a plurality of user interfaces.

4. The system of claim 2, wherein classifying each of the plurality of users into one of a plurality of competency levels comprises:

generating a competency score for each user based at least in part on the activity data; and classifying each of the plurality of users into one of a plurality of competency levels based at least in part on the competency score generated for each user.

5. The system of claim 1, wherein:

the request to display the at least one user interface of the one or more user interfaces is embodied as a request to display a user interface set comprising a plurality of user interfaces of the one or more user interfaces; and causing the display device of the cash handling device to display the applicable display variation of the at least one user interface of the one or more user interfaces comprises causing the display device of the cash handling device to display a display variation of each of the plurality of user interfaces of the one or more user interfaces within the user interface set in accordance with a display order of the plurality of user interfaces within the user interface set.

6. The system of claim 1, wherein each of plurality of display variations for a user interface are stored in the one or more memory storage areas together with a user interface identifier and a display variation identifier, and wherein:

causing the display device of the cash handling device to display the applicable display variation of the at least one user interface of the one or more user interfaces comprises retrieving the applicable display variation for the at least one user interface of the one or more user interfaces based at least in part on the user interface identifier for the at least one user interface and the display variation identifier for the applicable display variation.

7. A method for managing user interface screens to be presented via a cash handling device, the method comprising:

receiving, via one or more processors, a user identifier for a user provided to the cash handling device to enable use of the cash handling device by the user;

causing, via the one or more processors, a display device of the cash handling device to display an initial display variation of one or more user interfaces, wherein the initial display variation of the one or more user interfaces is displayed based at least in part on an initial competency level for the user identifier;

receiving, via the one or more processors, activity data for the user interacting with the initial display variation of the one or more user interfaces during use of the cash handling device, wherein the activity data is stored in association with the user identifier of the user and the activity data comprises at least one of:

data tracking key presses by the user interacting with the one or more user interfaces before the user presses a proper key on the one or more user interfaces;

data tracking movement of a cursor by the user on the one or more user interfaces; or data characterizing an interaction provided via a touch-screen device of the cash handling device displaying the one or more user interfaces;

determining, via the one or more processors, a competency score for the user based at least in part on the activity data;

executing, via the one or more processors, a machine-learning based model for selecting an applicable display variation for at least one user interface of the one or more user interfaces based at least in part on the competency score, wherein the applicable display variation is selected from a plurality of display variations for the at least one user interface;

receiving, via the one or more processors, a request to display the at least one user interface of the one or more user interfaces, wherein the request comprises the user identifier of the user; and causing, via the one or more processors, the display device of the cash handling device to display the applicable display variation of the at least one user interface of the one or more user interfaces.

8. The method of claim 7, further comprising training the machine-learning based model, at least in part, by:
receiving training data for a plurality of users, wherein the training data comprises activity data for each of the plurality of users;
classifying each of the plurality of users into one of a plurality of competency levels; and
assigning a display variation of the plurality of display variations to each of the plurality of competency levels.

9. The method of claim 8, wherein the training data comprises activity data corresponding to each of the plurality of users that is indicative of the plurality of users' interactions with a plurality of user interfaces.

10. The method of claim 8, wherein classifying each of the plurality of users into one of a plurality of competency levels comprises:
generating a competency score for each user based at least in part on the activity data; and
classifying each of the plurality of users into one of a plurality of competency levels based at least in part on the competency score generated for each user.

11. The method of claim 7, wherein:
the request to display the at least one user interface of the one or more user interfaces is embodied as a request to display a user interface set comprising a plurality of user interfaces of the one or more user interfaces; and
causing the display device of the cash handling device to display the applicable display variation of the at least one user interface of the one or more user interfaces comprises causing the display device of the cash handling device to display a display variation of each of the plurality of user interfaces of the one or more user interfaces within the user interface set in accordance with a display order of the plurality of user interfaces within the user interface set.

12. The method of claim 7, wherein each of plurality of display variations for a user interface are stored in one or more memory storage areas together with a user interface identifier and a display variation identifier, and wherein:
causing the display device of the cash handling device to display the applicable display variation of the at least one user interface of the one or more user interfaces comprises retrieving the applicable display variation for the at least one user interface of the one or more user interfaces based at least in part on the user interface identifier for the at least one user interface and the display variation identifier for the applicable display variation.

13. A computer program product comprising a non-transitory computer readable medium having computer program instructions stored therein, the computer program instructions when executed by a processor, cause the processor to:
receive a user identifier for a user provided to a cash handling device to enable use of the cash handling device by the user;
cause a display device of the cash handling device to display an initial display variation of one or more user interfaces, wherein the initial display variation of the one or more user interfaces is displayed based at least in part on an initial competency level for the user identifier;
receive activity data for the user interacting with the initial display variation of the one or more user interfaces during use of the cash handling device, wherein the activity data is stored in association with the user identifier of the user and the activity data comprises at least one of:
data tracking key presses by the user interacting with the one or more user interfaces before the user presses a proper key on the one or more user interfaces;
data tracking movement of a cursor by the user on the one or more user interfaces; or
data characterizing an interaction provided via a touchscreen device of the cash handling device displaying the one or more user interfaces;
determine a competency score for the user based at least in part on the activity data;
execute a machine-learning based model for selecting an applicable display variation for at least one user interface of the one or more user interfaces based at least in part on the competency score, wherein the applicable display variation is selected from a plurality of display variations for the at least one user interface;
receive a request to display the at least one user interface of the one or more user interfaces, wherein the request comprises the user identifier of the user; and
cause the display device of the cash handling device to display the applicable display variation of the at least one user interface of the one or more user interfaces.

14. The computer program product of claim 13, wherein the machine-learning based model is trained, at least in part, by:
receiving training data for a plurality of users, wherein the training data comprises activity data for each of the plurality of users;
classifying each of the plurality of users into one of a plurality of competency levels; and
assigning a display variation of the plurality of display variations to each of the plurality of competency levels.

15. The computer program product of claim 14, wherein the training data comprises activity data corresponding to each of the plurality of users that is indicative of the plurality of users' interactions with a plurality of user interfaces.

16. The computer program product of claim 14, wherein classifying each of the plurality of users into one of a plurality of competency levels comprises:
generating a competency score for each user based at least in part on the activity data; and
classifying each of the plurality of users into one of a plurality of competency levels based at least in part on the competency score generated for each user.

17. The computer program product of claim 13, wherein:
the request to display the at least one user interface of the one or more user interfaces is embodied as a request to display a user interface set comprising a plurality of user interfaces of the one or more user interfaces; and
causing the display device of the cash handling device to display the applicable display variation of the at least one user interface of the one or more user interfaces comprises causing the display device of the cash handling device to display a display variation of each of the plurality of user interfaces of the one or more user interfaces within the user interface set in accordance with a display order of the plurality of user interfaces within the user interface set.

18. The computer program product of claim 13, wherein each of plurality of display variations for a user interface are stored in one or more memory storage areas together with a user interface identifier and a display variation identifier, and wherein:

causing the display device of the cash handling device to display the applicable display variation of the at least one user interface of the one or more user interfaces comprises retrieving the display variation for the at least one user interface of the one or more user interfaces based at least in part on the user interface identifier for the at least one user interface and the applicable display variation identifier for the applicable display variation.

* * * * *